United States Patent [19]

Brown, III

[11] Patent Number: 5,471,596
[45] Date of Patent: Nov. 28, 1995

[54] COMPUTER MEMORY DEVICE HOLDING A DATA STRUCTURE FOR IMPLEMENTATION OF FUNCTION OBJECTS

[75] Inventor: Robert Brown, III, Nashua, N.H.

[73] Assignee: Digital Equipment Corporation, Maynard, Mass.

[21] Appl. No.: 338,267

[22] Filed: Nov. 10, 1994

Related U.S. Application Data

[63] Continuation of Ser. No. 868,015, Apr. 13, 1992, abandoned.
[51] Int. Cl.⁶ ..................................................... G06F 9/00
[52] U.S. Cl. ..................... 395/375; 364/DIG. 1; 364/DIG. 2; 364/286; 364/286.1; 364/286.2; 364/977
[58] Field of Search ........................ 364/DIG. 1, DIG.2; 395/400, 425, 600, 650, 375, 500, 800

[56] References Cited

PUBLICATIONS

Table of Contents and chapters 1, 2 and 7 of *VTAM Version 3 Releases 1 and 1.1 Programming, IBM* (Jul. 1986). Published in the United States of America.

*Primary Examiner*—Robert B. Harrell
*Attorney, Agent, or Firm*—Arnold, White & Durkee

[57] ABSTRACT

A method and associated structures for creating and implementing applications using function-objects, wherein each function to be performed by an application is embodied in a "function-object" that can adapt itself to various devices or interfaces that it encounters. Program designers can mix and match routines such as input and output routines by setting variants of a function-object.

9 Claims, 10 Drawing Sheets

Function-Object: SEARCH_DATABASE

VARIENT: SEARCH DATABASE A
VARIENT: SEARCH DATABASE B
VARIENT: SEARCH DATABASE C
VARIENT: SEARCH DATABASES A, B
VARIENT: SEARCH DATABASES A, C

Function-Object: RECEIVE_QUERY

VARIENT: FROM TERMINAL TYPE A
VARIENT: FROM TERMINAL TYPE B
VARIENT: FROM PROCESS A
VARIENT: FROM PROCESS B
VARIENT: GENERATE OUTPUT FOR DATABASE A
VARIENT: GENERATE OUTPUT FOR DATABASE B

Function-Object: DISPLAY_RESULTS

VARIENT: DISPLAY ON TERMINAL TYPE A
VARIENT: DISPLAY ON TERMINAL TYPE B
VARIENT: DISPLAY ON PRINTER A
VARIENT: DISPLAY ON PRINTER B

FIG. 6

Routines for Function-Object: TRANS

| INTIALIZATION | GZINTA | GZOUTA | CONTROL | DESTROY |
|---|---|---|---|---|
| init | get_fr_screen<br>get_fr_file | output_ptr<br>output_hdsk<br>output_opdsk | control | destroy |

FIG. 7A

VARIENTS FOR TRANS

1. DATA FROM SCREEN, OUTPUT TO PRINTER
2. DATA FROM SCREEN, OUTPUT TO OPTICAL DISK
3. DATA FROM FILE, OUTPUT TO OPTICAL DISK
4. DATA FROM SCREEN, OUTPUT TO HARD DISK

FIG. 7B

Routine Matrix Array for Function-Object: TRANS

|  | INITIALIZATION | GZINTA | GZOUTA | CONTROL | DESTROY |
|---|---|---|---|---|---|
| VARIENT 1 | init | get_fr_screen | output_ptr | control | destroy |
| VARIENT 2 | init | get_fr_screen | output_opdsk | control | destroy |
| VARIENT 3 | init | get_fr_file | output_opdsk | control | destroy |
| VARIENT 4 | init | get_fr_screen | output_ptr | control | destroy |

FIG. 7C

Routine Matrix Array for Function-Object: TRANS

|  | INITIALIZATION | GZINTA | GZOUTA | CONTROL | DESTROY |
|---|---|---|---|---|---|
| VARIENT 1 | init | get_fr_screen | output_ptr | control | destroy |
| VARIENT 2 | init | get_fr_screen | output_opdsk | control | destroy |
| VARIENT 3 | init | get_fr_file | output_opdsk | control | destroy |
| VARIENT 4 | init | get_fr_file | output_hdsk | control | destroy |
| VARIENT 5 | init | get_fr_screen | output_hdsk | control | destroy |

FIG. 8A

Routine Matrix Array for Function-Object: TRANS

|  | INITIALIZATION | GZINTA | GZOUTA | CONTROL | DESTROY |
|---|---|---|---|---|---|
| VARIENT 1 | init | get_fr_screen | output_ptr | control | destroy |
| VARIENT 2 | init | get_fr_screen | output_opdsk | control | destroy |
| VARIENT 3 | init | get_fr_file | output_opdsk | control | destroy |
| VARIENT 4 | init | get_fr_file | output_hdsk | control | destroy |
| VARIENT 5 | init | get_fr_screen | output_hdsk | control | destroy |
| VARIENT 6 | init | get_fr_screen | output_ptra | control | destroy |
| VARIENT 7 | init | get_fr_file | output_ptra | control | destroy |

FIG. 8B

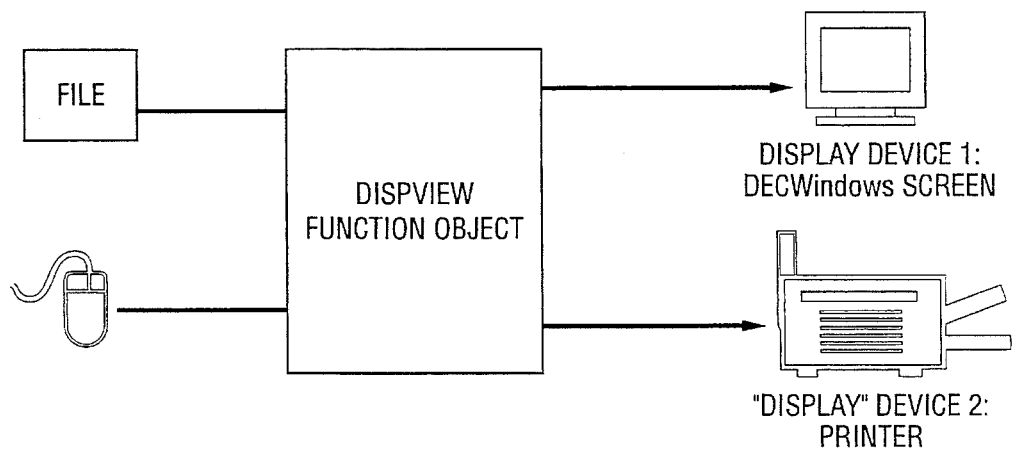

FIG. 9

COMPUTER MEMORY DEVICE HOLDING A DATA STRUCTURE FOR IMPLEMENTATION OF FUNCTION OBJECTS

This application is a continuation of application Ser. No. 07/868,015, filed on Apr. 13, 1992, now abandoned.

INTRODUCTION

1.1 Field of the Invention

The present invention relates to the art of computer programming and more particularly to the discipline of Object Oriented Programming (OOP).

The appendixes (referred to as "code listings") include copyrighted material; permission is granted to make copies of this material solely in connection with and for the purpose of making copies of this application and any patent issuing thereon, but for no other purpose.

1.2 Background of the Invention

1.2(a) Object-Oriented Programming

The present invention relates to an improved method and structures for implementing various applications on computing machines. In Object-Oriented Programming (OOP), a programmer creates data structures that contain both data and information on how to manipulate that data (sometimes referred to as "methods"). The combination of data and methods is referred to as an "object." Instead of calling a function which does something to data, as in traditional programming, in OOP a programmer sends a "message" to an object which, because of its previously stored methods, knows how to respond to the message and does so appropriately. As those of ordinary skill are aware, an action "performed" by an object is actually performed by a suitably programmed processor.

The differences between traditional programming and OOP are better explained through illustration. FIG. 1 graphically illustrates a traditional program that includes a routine which creates and displays a window and a button. Generally, in traditional programming, the programmer focuses on algorithms and often must devote excessive attention to managing routine matters such as complex input/output schemes in order to handle different situations. For example, FIG. 2 illustrates a portion of the traditional programs used to create and display the window and the button. As illustrated in FIGS. 1 and 2, for the traditional program to create and display the window and the button, the main program must call a single creation function to create the window and the button, and a single display routine to display them. As is clear from FIG. 2, however, both the create and display routines must check to determine the type of data it is dealing with (i.e., window or button) each time it is called. This checking step appears relatively simple in this example where there are only two types of data. In large programs, however, there may be numerous data types and the routines may have to determine the type of object several times. This results in both cumbersome operation of the system and could result in a greater possibility of design errors which could result in bugs in the system.

In contrast to the method described above, FIG. 3 illustrates the same application described above implemented through the use of object oriented techniques. In the object-oriented architecture, the main routine calls a single interface which generates "messages" to previously defined window and button objects. The cumbersome branching and checking on the type of data presented is reduced and the programming interface is simplified.

Some of the advantages of OOP over traditional programming are: (a) simplification of programming interfaces, (b) modularity of code, and (c) reusability of code. These advantages can help increase the productivity of software engineers and programmers.

1.2(b) Traditional Objects in Object-Oriented Programming

Although traditional OOP achieves several advantages over traditional programming, it still has its shortcomings.

One problem with traditional OOP is that objects created using OOP techniques are normally static. In other words, once the data and method for a particular object are defined using OOP they remain constant and they cannot be changed. Any additional changes would destroy the old object and create a new one. This inability to modify existing objects often renders it difficult to build flexible and extensible programming interfaces using OOP methods.

Using traditional OOP it is often difficult to integrate software developed with one system or platform with other systems or platforms. For example, in the area of local-area-networks it is quite desirable to allow computing machines having different hardware and software platforms to communicate and share objects (e.g., an APPLE Macintosh and an IBM PC or compatible; or a system with PCSA (Personal Computer System Architecture) and a system developed on the VAX/VMS platform). Using traditional OOP it is often difficult to integrate between different platforms since the code which comprises an object is generally platform-specific. Thus, while a window object existing in a system having a VMS platform may appear on the screen when the instruction "DISPLAY" is received, that same object may not appear if it is existing in a system with a DOS platform.

Another disadvantage associated with regular OOP is that a programmer building an object in regular OOP has to define and create all interfaces to each object as well as the object's "attributes." Even with the concept of "inheritance" (the creation of subclasses which inherit attributes or methods from other classes) there are situations where specific methods must be defined and created to handle data specific to a subclass.

2. SUMMARY OF THE INVENTION

The present invention overcomes several of the disadvantages associated with traditional OOP objects through the use of novel methods associated with non-traditional "function-objects". Function-objects constructed in accordance with the present invention enable a programmer to dynamically "build" an "object" and associate that object with code and data. Generally speaking, a function object is a data structure which contains all the pointer and data information necessary for a processor to perform a specified "function." In one embodiment of the present invention, a function-object comprises a routine matrix array having pointers therein for associating various input routines with various output routines and for further associating those routines with an operational data structure. According to a method of the present invention, all of the input and output routines to which the routine matrix array of a function-object points are constructed to receive as their inputs a pointer to the same operational data structure. By developing specialized input and output routines a user of function-objects can create an application that can adjust itself to any device or interface that it encounters.

Several advantages may be achieved through the practice of the present invention. In particular, the use of function-objects according to the present invention enhances a designer's ability to design, build and use object-oriented systems and applications—even if the designer is required to use programming languages with non-OOP features such as "traditional" C and Pascal. Further, the present invention enables software engineers to easily integrate existing software that may or may not be compatible and also eliminates many problems associated with writing extensible or reusable software.

Still further the design and use of function-objects in accordance with the present invention addresses two problems often encountered by individual users and programming organizations: (1) the need to design increasingly intelligent and flexible applications, and (2) the difficulties associated with integrating different applications (or parts of applications) that are, on the surface, incompatible. Function-objects in accordance with the present invention create a simple framework which allows already existing code to be reusable with a minimum of modifications and allows modules that are not normally compatible to coexist with each other.

A still further advantage of the present invention is that the method of using function-objects in accordance with the present invention facilitates the design of complex architectures for intelligent and flexible applications.

A still further advantage of method of the present invention is that it imposes a simple but flexible structure on all modules in an application, causing an automatic introduction of modularity that is created using function-objects in accordance with the present invention.

3. BRIEF DESCRIPTION OF THE DRAWINGS

Figure 4A:
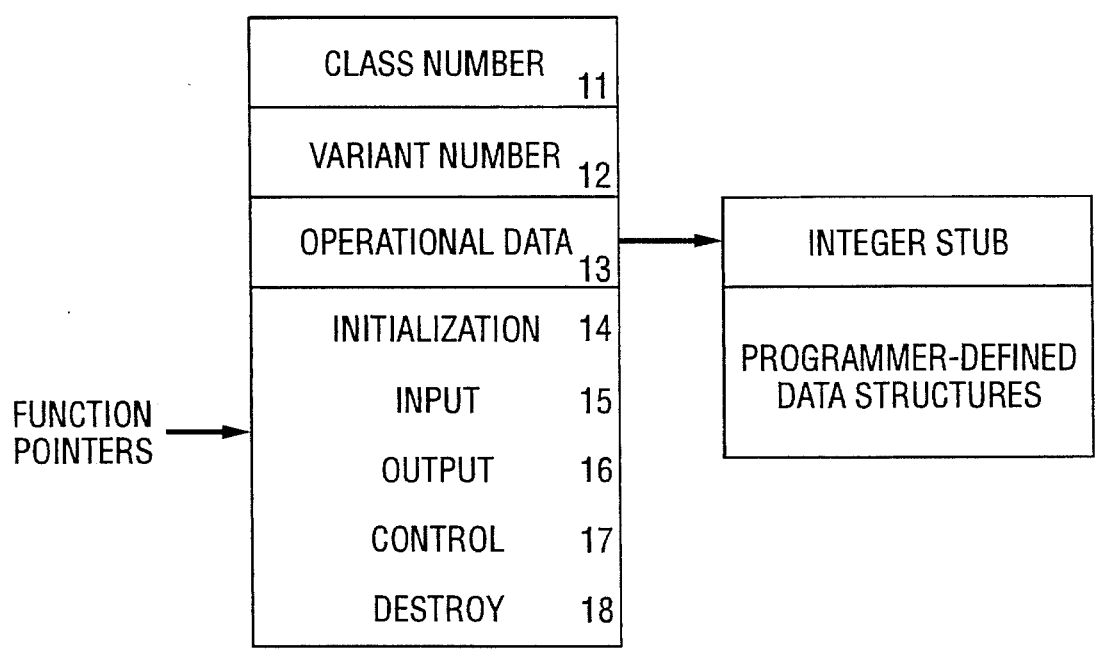
Figure 4B:
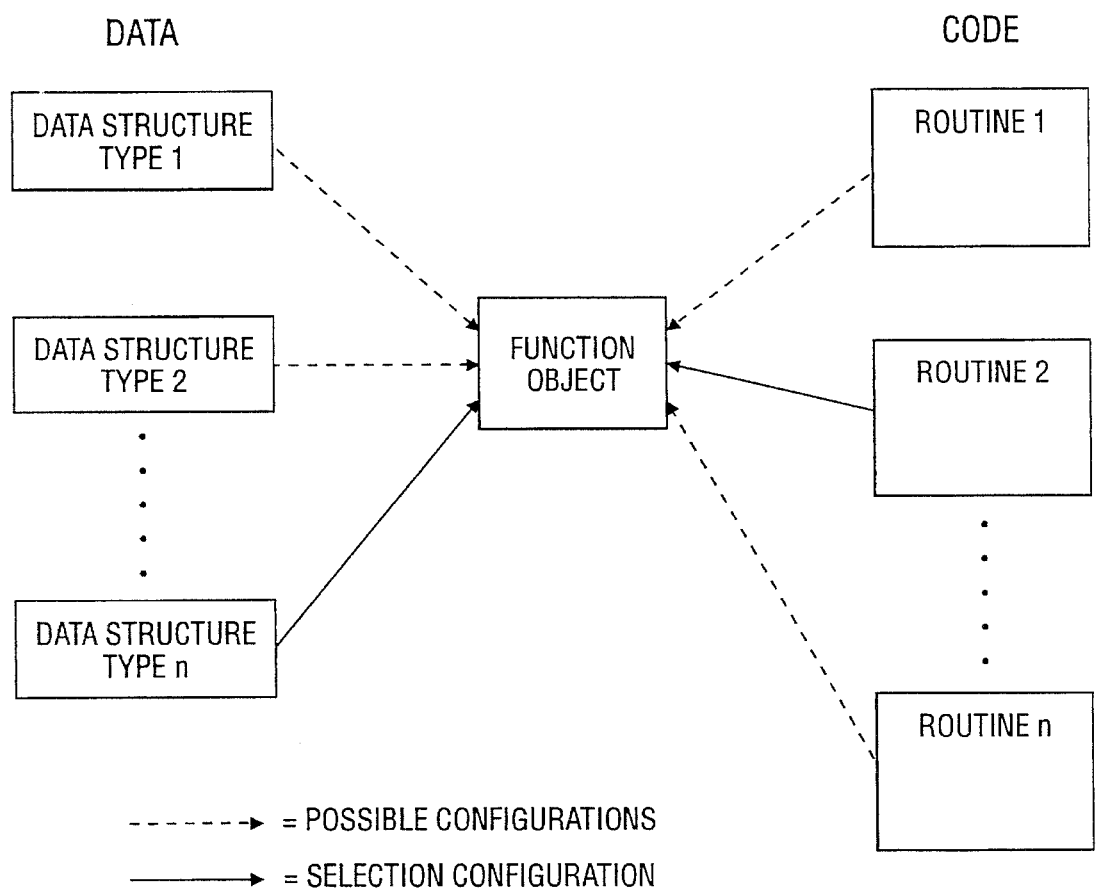
Figure 5:
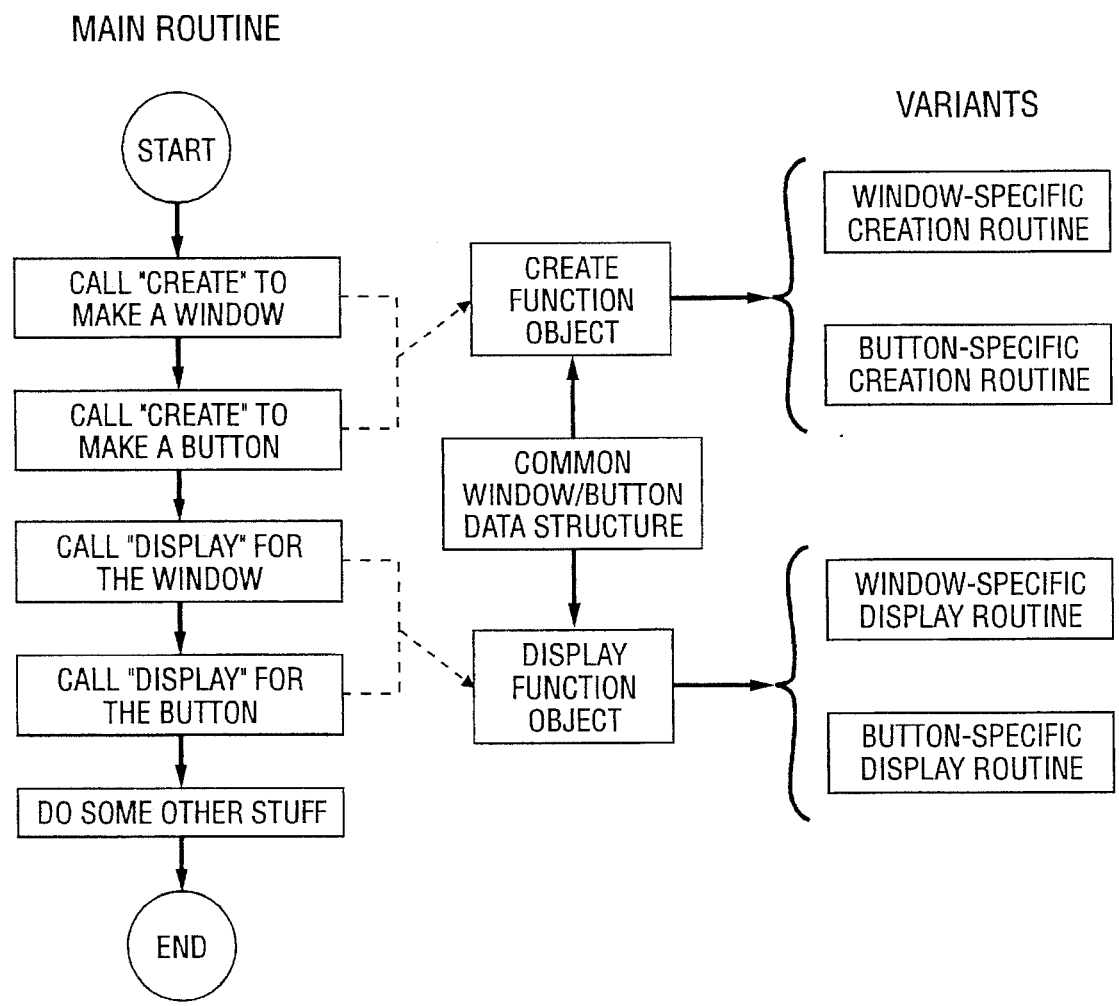

FIGS. 4A–4B graphically illustrate a function-object constructed in accordance with the present invention;

FIG. 5 illustrates an application using function-objects for creating and displaying a button and a window;

FIG. 6 illustrates one possible application of function-objects constructed in accordance with the present invention;

FIGS. 7A, 7B and 7C illustrate in greater detail a function-object constructed in accordance with the present invention;

FIGS. 8A–8B illustrate the flexibility and modularity available through practice of the present invention; and FIG. 9 illustrates an example application of the present invention.

4. DESCRIPTION OF A SPECIFIC EMBODIMENT

4.1 GENERAL CONCEPTS

Function-objects constructed in accordance with the present invention extend the concept of OOP into an area of software engineering that is not normally associated with such disciplines. Function-objects extend the concept of OOP by defining the individual functions performed by an application as being objects themselves. By looking at actual functions as objects, an application designer can more easily compartmentalize the functions of an application. Through the use of function-objects, users can also create "intelligent" functions which are capable of adapting themselves to different devices, protocols, user interfaces, or any other functional requirement encountered by the user.

As used herein the term "user" describes a user who uses function-objects in the design and implementation of applications. It does not describe those who use the application itself.

Before discussing the programming concepts of a "function-object" used herein, it is helpful to describe the general concepts of "function-object" through analogy.

The concepts associated with function-objects are somewhat akin to those associated with ordering a Chinese meal from a menu which allows for the choice of different salads, then a choice between different soups, then a choice of entrees, and then some dessert.

To "program" the Chinese meal in traditional procedural programming one would have a program that allows only one type of salad, one type of soup (say, Hot-and-Sour), one specific entree, and one specific dessert. For example, a procedural "program" for a Chinese lunch, if done with an ordinary procedural function, could be illustrated as follows:

1: Enter and be seated
2: Drink orange pekoe tea
3: Have hot-and-sour soup
4: Have some fried rice and spicy chicken
5: Eat a fortune cookie
6: Pay and leave Notably, when the meal is "programmed" in a traditional, procedural fashion, the diner would be forced to eat the same combination of foods when ever that particular "meal" program is run. Here, not only does the "program" need to set out the steps for the meal, it must also include all of the steps for obtaining, preparing, serving and consuming the appropriate food elements. Thus, if the diner wanted to vary his meal, he would have to write another detailed program setting forth step-by-step how the different dining scenario will unfold. With function-object concepts, however, the Chinese meal would be quite different. This is because, function-objects maintain the know-how necessary to perform the requested function and also allow the user to select variants of that function so that its behavior can change behavior upon command.

Thus, to "program" the Chinese meal using function-objects, one would first define the various functions performed during the meal and also define the various ways ("variants") in which each function could be performed. Thus, the function-objects for the meal would be defined as:

Drink_Tea:
(1) Drink orange pekoe
(2) Drink rose
(3) Drink herbal
(4) Drink ginseng Have_Soup:
(1) Have Hot-and-Sour
(2) Have Wonton Have_Entree:
(1) Have Fried Rice & Spicy Chicken
(2) Have Fried Rice & Lo Mein
(3) Have Quadri Delights Eat_Dessert:
(1) Eat Fortune Cookie (2) Eat Almond Cookie Each of the defined function-objects would have the know-how (including, e.g., recipes) to perform the function that the user requests. For example, the function-object Have_Entree would possess all the necessary information needed to obtain, prepare and serve all of the three possible dishes. Thus, whenever the function-object Have_Entree received both a variant number and a run command, it could prepare and serve the requested dish. Once the function-objects are properly defined, the diner's meal program is quite simple:

Procedure:

1. Enter and be seated
2. Select and Run Drink_Tea
3. Select and Run Have_Soup
4. Select and Run Have_Entree
5. Select and Run Eat_Dessert
6. Pay and leave where the "Run" sets the appropriate "variant" for each of the defined function-objects. Note that the diner now can have a variety of meals without having to significantly change his meal "program." Since the function-objects for the meal and their variants are already defined, all that the diner need do to change his meal plan is to change the variant number for each of the function-objects. Thus, although the diner must make the initial effort of defining the required function-objects in a pre-established manner, he is rewarded in the long run because he can have a great variety of meal "programs" with little or no effort. This is beneficial over the traditional meal "program" where the diner must prepare a completely new meal "program" for each different meal.

4.2 FUNCTION OBJECTS

A "function-object" constructed in accordance with the present invention is a data structure which contains all pointer and data information necessary for a processor to perform a specified function. As used herein "function" is a generic term describing anything a computer can do—from handling a workstation screen to interfacing with a device. Notably, a group of function-objects in accordance with the present invention can function both as a methodology as well as a library of executable functions. They can provide a framework in which complex systems can be designed. Further, systems designed using function-objects have a built-in extensibility as well as the ability to interface in heterogeneous environments.

FIG. 4A contains a pictorial representation of a generic function-object 10 constructed in accordance with the present invention. As noted, function-object 10 contains all data, pointers to data, and pointers to functions, which the function-object would require to perform its task.

Function-object 10 is not a single function, but instead is an association of data and routines which act as "attributes" and which can be changed according to the environment that an application using it must interact in. The attributes of function-object 10 include: (1) a class number 11; (2) a variant number 12; (3) operational data 13; (4) an Initialization Function Pointer 14; (5) an Input Function Pointer 15; (6) an Output Function Pointer 16; (7) a Control Function Pointer 17; and (8) a Destroy Function Pointer 18. A more detailed discussion of these attributes is contained in the following sections.

4.2(a) Class Numbers

In traditional OOP a "class" is a term used to describe groups of objects. Objects in the same class have similar characteristics and groups of objects within a class (called "subclasses") are able to inherit the characteristics of a class. This term is used the same way when dealing with function-objects.

Functions that perform similar tasks can be grouped into "classes." As used in the present invention, the class that a function-object falls into is represented by a number. In this implementation (see code listing 1), a function object's class is set to the size of the operational data structure (operational data is described in section 4.2(c)). This class number is useful for classifying groups of function-objects. In one envisioned embodiment of the present invention, there may be several possible classes of function-objects: (1) a "file service enumeration class" of function-objects which lists the available directory services of different LAN servers; (2) a "data write class" made up of function-objects which write data to different devices (in different formats); and (3) a "Window Drawing" class made up of function-objects that draw different kinds of windows on a workstation screen.

4.2(b) Variant Number

As used herein a variant number is used to describe different variations of a function that are used in different situations. Variants of function-objects are what make them capable of changing their operation under different circumstances.

The variant number of a function-object defines a function-object as having unique characteristics within a class. A function-object with a "data write" class, for example, may need to handle different formats in order to write to two or more different types of printers. Each printer format that the function-object has to handle is called a variant and each variant is represented by a unique number.

4.2(c) Operational Data

Function-objects must be able to interface with some device associated with them. This "device" can be of many diverse kinds, such as a tape device, a DECWindows workstation, or a network connection to a remote process. A function-object's operational data is represented as a pointer to a data structure which contains all information (examples: file descriptors, CURSES window structures under UNIX-like operating systems, or Socket connections) that the function-object may require in order to interface with the device with which it is associated. Function-objects also use operational data to save or maintain their own states in the course of their operation.

The operational data varies with the class of function-object used. Function-objects designed to talk along a DECnet link will have different operational data than that of function-objects designed to control a printer device. A basic data abstraction technique is used to create the different data types in a function-object. The creation of operational data structures is described in a later section.

4.2(d) Initialization Function Pointer

As used herein, a "routine" is generally a collection of user-defined codes which perform the component tasks required by a function-object. Routines are pointed to by "function pointers."

When a function-object is built, it may need to perform a series of initializations (such as the opening of files, connection to remote processes, or the initialization of a workstation). This pointer points to a user-defined routine that performs the initialization.

4.2(e) Input Function Pointer

This user-defined routine handles all input that is required by the function-object. This input can take the form of user input, data received on a network, or information contained in files or input/output devices. In function-objects, the term "input" is relative; the Input function does whatever is necessary to get information that a function-object will need. In the case of an object that must get user input for a display, the Input Function Pointer would point to a routine that displays a prompt and gets the user input. There may actually be an array of pointers to different input routines for a function-object with more than one variant. In such a case the current variant number is used as an index into the array to select the pointer to the appropriate input routine.

4.2(f) Output Function Pointer

This user-defined function complements the Input Function pointer. It handles all output that the function-object requires. As with the input function, the term "output" is relative; a function-object that outputs to a workstation could put up an interactive display window. An object that communicates to a synchronous device could send data and wait for the appropriate response from the device. The Output Function pointer points to a user-defined routine, so how it is used is up to the user. As with the input function pointer the output function pointer may actually be an array where variant number is used as an index to select the pointer to the appropriate output routine.

4.2(g) Control Function Pointer

This pointer points to an "extra" routine which can be used to manipulate specific attributes or data in the function-object. It may not always be necessary to have a real routine defined here; since it is user-defined, it can be sent to NULL if it is not needed by the function-object.

4.2(h) Destroy Function Pointer

When a function-object is no longer needed because it has performed its function, it is destroyed by the function "DestroyFunction" (see Section 4.4(h)). A function-object may, however, have data structures and other information that were built for it by the initialization routine. If so, then the function-object will require a pointer to a routine which "destroys" the data and pointers that was specific to it. As with all other pointers, the destroy function pointer is set to zero or NULL if a routine is not needed.

4.2(i) Comparison of the Present Method Using Function-Objects With Prior Methods for Implementing Applications FIG. 4B further illustrates a function-object of the present invention. As illustrated there are several possible data structures and code routines that may be associated with the function-object. As discussed above, each possible configuration is referred to as a variant. In the example of FIG. 4B, the variant associated with Data Structure Type n and Code Routine 2 has been selected.

Several of the differences of the methods of the present invention and other methods are illustrated in FIGS. 1–3 and FIG. 5. As discussed above, FIGS. 1–3 illustrate both a traditional program and a traditional OOP program for creating and displaying a window and a button.

Figure 1:
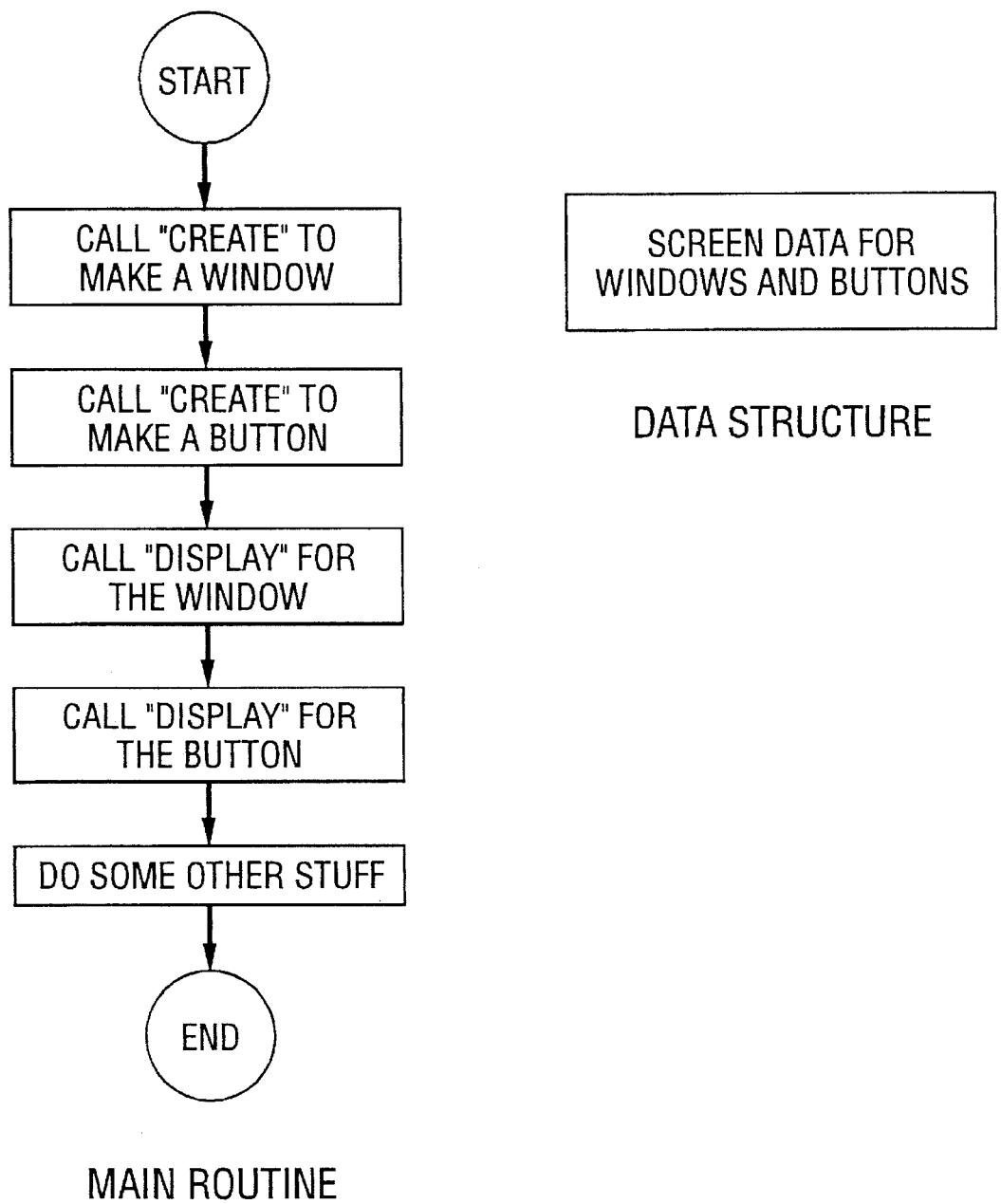
FIG. 1 illustrates a traditional program for creating and displaying a button and a window.
Figure 2:
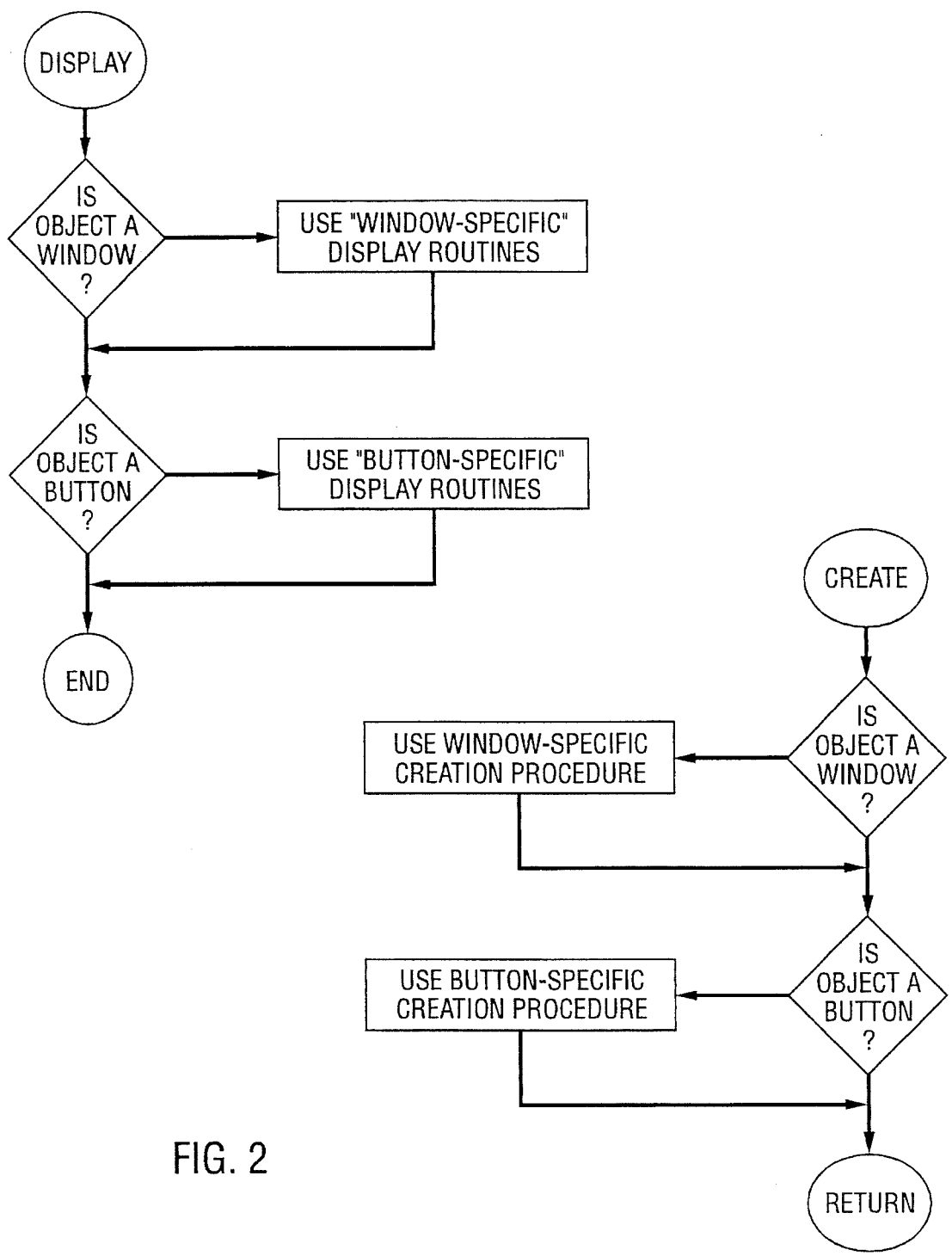
FIG. 2 illustrates portions of traditional programs that may be used to create and display a button and a window.

In the traditional program, illustrated in FIGS. 1 and 2, a main routine must make two separate calls to two separate routines. First, the program must call subroutine "create" to make a window. The create subroutine, illustrated in FIG. 2, must then step through several branches to determine if a window or a button is to be created and then select the widow-specific create routines. This process is repeated for the creation of the button and a similar procedure is followed for the display of the button and the window.

Figure 3:
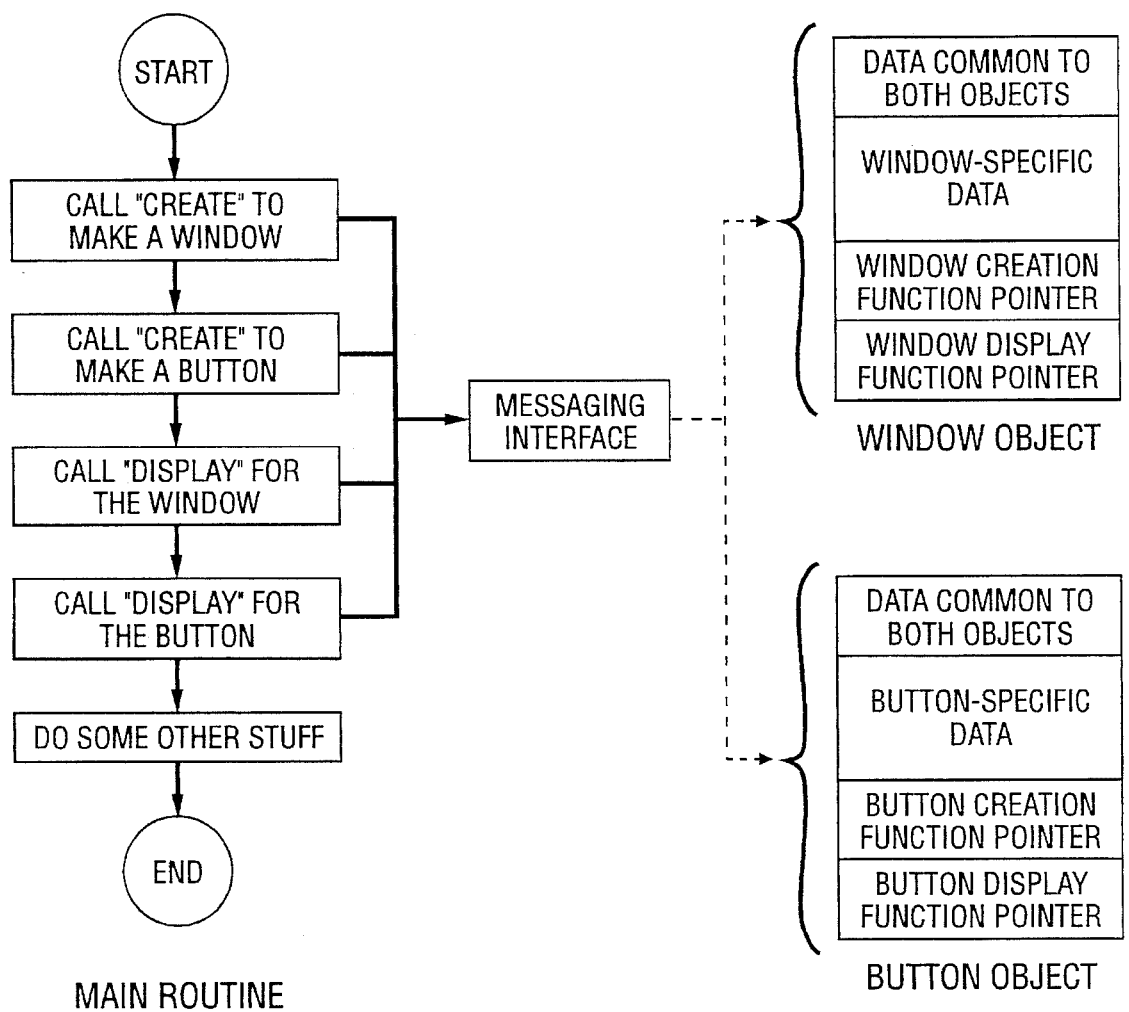
FIG. 3 illustrates an Object-Oriented Program for creating and displaying a window and a button.

In contrast to traditional programming, the implementation of the create and display application in traditional OOP is illustrated in FIG. 3. As FIG. 3 illustrates, in traditional OOP, the main program need only make two separate calls to two objects. First the main routine must send a "create" message to both the window and the button objects. Next the main routine must send a "display" message to both the window and button objects.

In FIG. 5, the implementation of the same application using function-object is illustrated. Here, to create the window and the button, the main program need only send different variants of the same message to one "CREATE" function-object. In the first case the main routine will send a message to the CREATE function-object with the variant number indicating that a window is to be created. In the second message the main routine will inform the CREATE function-object that a button is desired. The same procedure is repeated in communications with a display function-object.

4.3 METHOD FOR CREATING A FUNCTION-OBJECT AND IMPLEMENTING an Application Using the Function-Object Under a method in accordance with the present invention, one may create a function-object based application by following a general five step procedure.

4.3(a) Defining the Function-Objects

First, the user must define the function-objects required. This step requires the programmer to think about the particular application he is trying to implement and determine how many different functions there are. Additionally, this step requires the programmer to consider how many variants of each function-object are needed.

For a relatively simple application, i.e., an application that is to copy one file from one memory device to another memory device, there may be only one function that the application must perform, e.g. COPY. For such simple applications, however, there may be several variants that will be required; i.e., the application must be able to copy to and from different devices that may have different interface requirements. For example a function-object for the function COPY may have several variants each corresponding to a different combination of input and output devices; e.g., a hard disk to a reel-to-reel tape, or from an optical disk to a hard disk and visa versa.

For more complex applications there may be several function-objects, and several variants of each function-object, required. For example, an application that is to receive a database search query from a user, search a database for occurrences of the query, and output the results of the search to a screen or a printer, there may be three separate and distinct function-objects necessary for implementing the application: (1) a RECEIVE_QUERY function-object for receiving the database query and generating a search string; (2) a SEARCH_DATABASE function for searching the database and building a results file; and (3) a DISPLAY_RESULTS function-object for displaying or printing the results of the search.

Additionally, in this example there may be several variants for each function-object. For example the RECEIVE_QUERY function-object may be required to accept query inputs from different types of terminals or from different software processes or to generate a query output file that will vary depending on the type of database to be searched. Alternately the SEARCH_DATABASE function-object may be required to accept query search string and modify the search strings so that different types of databases can be searched.

An illustrative example of the way function-objects and variants may be defined for the database query application discussed above is depicted in FIG. 6.

4.3(b) Creating the Data Structures and Function Pointers Needed for the Defined Function-Objects Once the programmer has determined how many and what types of function-objects and variants are necessary to implement the desired application, he must then define and create the operational data that each function-object will use.

At this step, the design should associate each variant for a particular function-object with a variant number. This number should generally be greater than zero, since zero is best reserved for the base variant for each function-object.

After associating each variant for each function-object with a variant number, the programmer should then define a data structure to be used by each function-object. The data structure for a function-object can contain anything that the programmer desires but should include all of the data that the function-object will need.

Additionally, the data structure should be defined so that it can serve as an argument for all five of the function-objects functional components or "routines" to be described below.

Each function-object of the present invention has associated with it at least five types of routines. Basically, a routine is the functional component for a function-object and serves to (1) initialize the function-object, (2) obtain input data on which the function-object can operate, (3) generate the function-object's output data, (4) control certain aspects of the function-object, or (5) destroy the function-object. Each of these function components is associated with a different "routine type." Initialization routines are of the type "initialization"; input routines are of the routine type "gzinta"; output routines are of the routine type "gzouta"; control routines are of the type "control"; and destroy routines are of the routine type "destroy." Each of these routines is discussed below.

Each of the five routine types is listed in FIG. 7A. Also illustrated in FIG. 7A are several specific routines for several of the routine types that may be associated with a function-object "TRANS" that is to get information from one source and save it in another. For example, routines GET_FR_SCREEN and GET_FR_FILE are both routines for obtaining input for the function-object and thus both are "gzinta" routines. Likewise both OUTPUT_PTR, OUTPUT_HDSK and OUTPUT_OPDSK are each routines for outputting data to a printer, hard disk or optical disk, respectively.

FIG. 7B lists as an example, four variants that the programmer may have defined for in step on for the function-object TRANS. As illustrated, function-object TRANS has a variant for receiving data from the screen and transferring it to a printer (variant 1), one for receiving data from the screen and transferring it to an optical disk (variant 2), one for receiving data from a file and transferring it to the optical disk (variant 3), and one for transferring a file from a file to a hard disk (variant 4).

In order to ensure that the proper routines are select for each variant, the programmer must define a routine matrix array for each of the five routine types described above. This is done as illustrated in FIG. 7C. In this example it is assumed that the initialization, control and destroy routines for all of the variants are the same. Note that variant 1 will select the appropriate gzinta and gzouta routines, as will variants 2, 3 and 4.

FIGS. 7A–7C help illustrate the modularity and the reusability that function-objects bring to programming. Note that both variants 1 and 2 share the same gzinta routine and variants 2 and 3 share the same gzouta routine. If another variant was found to be necessary, i.e., a variant for input from the screen and output to the hard disk, it could easily created by defining a variant 5 and expanding the routine matrix array to include pointers to the desired routines. This is done in FIG. 8A.

Further, the above figures illustrate the way that function-objects can be used to easily implement new interfaces. Assume that the above TRANS function-object was defined but that a new output device, i.e., a printer type incompatible with the first printer was added to the system. To enable TRANS to receive input from either of the two input routines and to output it to the new printer, one would only need to define two new variants, variant 6 and 7, and include a pointer to a one new gzouta routine, OUTPUT_PTRA. This is illustrated in FIG. 8B.

After determining the number and types of routines that are needed and constructing the routine matrix array, the programmer has completed the data structure and function definition. The programmer must then write the code for each of the separate routines discussed above. The only significant restriction that is placed on the programmer in writing these routines is that each routine should receive as its argument the data structure defined for its associated function-object as described above. The exact structure of each routine will depend on the particular application to which the function-object is addressed. The generation and construction of such routines is believed to be within the skill of one trained in the programming art and will not be further discussed herein.

4.3(c) Creating the Function-Object

Once the routine matrix array has been constructed and the code for each routine written, the creation of a function-object is a relatively simple task and is accomplished by running the CreateFunction routine of the "Function-Object Interface" (FOI) of the present invention that is discussed below.

4.3(d) Use of the Function-Object

Like the creation of a function-object, the use of a function-object is a relatively simple task and is accomplished by defining the variant of the function-routine to be used and calling the RunRoutine routine from the FOI of the present invention to run the gzinta and gzouta routines for the selected variant.

4.3(e) Destruction of the Function-Object

The destruction of a function-object is accomplished by calling the DestroyFunction routine from the FOI.

4.4 The Function-Object Interface

The function-object interface (FOI) of the present invention comprises the following functions: (1) the "SetupEnvironment" function; (2) the "CreateFunction" function; (3) the "RunRoutine" function; (4) the "SetRoutine" function; (5) the "SetAllRoutines" function; (6) the "GetVariant" function; (7) the "SetVariant" function; (8) the "DestroyFunction" function; and (9) the "CleanupEnvironment" function. Regardless of the type of function-objects defined by the programmer the FOI interface remains the same and its framework does not affect the functionality of the created function-object. Thus, function-objects created using the FOI of the present invention can be used to quickly develop a new product or easily integrate incompatible products which may already exist.

It should be noted that the FOI does not generally manage networks, user-interfaces or anything else that a programmer would want to manage. What the FOI manages is function-objects, rarely more. There are generally no actual "function-objects" provided by the FOI. Instead, the FOI provides a series of functions for creating, destroying and setting the "variant" of function-objects. It is up to the programmer to define the function-object and what it will do in the system. In other words, a programmer would first define the data and the "variants" that will make up the function-object, and then use the FOI to put the function-object together. If, for example, a programmer wishes to use function-objects in network management, the programmer would first write the code that would manage the various network types, define the data that could would use and then use the FOI to create the framework for properly using the code and the data.

Each of these functions is described below and a prototype function is provided. These descriptions are believed sufficient to enable one skilled in the art to practice the present invention. Additionally, a detailed code listing setting forth one way in which the FOI of the present invention may be implemented is attached as Code Listing I.

4.4(a) Setup Environment

This function should be the first function called whenever a specific environment is necessary for the application's operation. For example, if the application is one which runs under DECWindows, calling SetupEnvironment will be useful for performing the necessary initialization routines for DECWindows. If no specific environment is necessary, it is unnecessary to call this function.

"SetupEnvironment" creates a function-object which handles the environment that the application requires. In the DECWindows environment example, the initialization routine pointer performs the DECWindows initialization procedure and creates the main window and menu bar "widgets" for the application. The input or output routine would enters the DECWindows event loop (one or the other of these routines is used in a DECWindows application because the DECWindows event handler handles input and display of widgets. Any routines that are not used can be set to NULL). The control routine if desired enables the programmer to change the attributes of certain DECWindows widgets or change the event handler (if no such functions are necessary, the control routine can be set to NULL), and the destroy routine "cleans up" the DECWindows widgets by freeing up their memory prior to exiting the application.

The prototype for this function is:

```
Function SetupEnvironment(short classtyp,void(*intf)(),void(*getf)(),
                          void((*displf)()),void((*undisf)()),void((*destf)()))
``` where classtyp is the "class" of the function, initf is a pointer to the initialization routine, getf points to the input routine, displf points to the output routine, undisf points to the control routine, and destf points to the "destroy" routine.

Upon successful completion, "SetupEnvironment" returns a pointer of type "Function", which represents the function-object that is created for the environment. This function-object can be run using the "RunRoutine" function described later in this application. If "SetupEnvironment" falls, it returns a NULL.

4.4(b) CreateFunction

This function creates a function-object. Its prototype is:

```
Function CreateFunction(short class,short var,void(*initf[])(),void ((*gzinf[])(),
                        void((*gzouf[])()),void((*contf[])()),void((*destf[])(),
                                                                    Function parent)
``` where class is the class of function-object, var is the initially chosen variant for the function-object, initf, gzinf, gzouf, contf, and destf point to arrays of routines for initialization, input, output, control, and destruction, respectively, and parent is a pointer to a function-object that was created by SetupEnvironment (if no specific environment is created, parent can be set to NULL).

Upon successful completion, CreateFunction returns a pointer to the newly created function-object. Otherwise, it returns a NULL.

When the CreateFunction is implemented a function-object is created. In creating a function-object with this function the FOI creates a complex, multi-faceted procedural function from building blocks that are classified as *initf[]; *gzinf[]; *gzouf[]; *contft[]; and *destf[]).

4.4(c) RunRoutine

"RunRoutine" runs one of the function-object's routines. These routines were defined in "SetupEnvironment" or in "CreateFunction". Its prototype is:

```
void RunRoutine(Function the func,short select)
``` were the func is the function-object whose routine is to be run, and select is a flag indicating which routine to run. Select can have one of the following values:

1. InitFunc—run the initialization routine
2. GzinFunc—run the input routine
3. GzouFunc—run the output routine
4. ContFunc—run the control routine
5. DestFunc—run the "destroy" routine Through the use of RunRoutine a user may make calls to the function-objects created with CreateFunction, with the actual code that is run being varied by the variant which was selected prior to the calling of CreateFunction.

4.4(d) SetRoutine

This function is intended to give programmers the ability to set individual routine pointers in their function-objects to a routine that is not one of the previously defined variants. The prototype is:

```
void SetRoutine(Function the_function, short select,
                                              void((*thesel)()))
``` where the_func is the function-object whose routine will be changed, select is a flag indicating which routine pointer will be changed, and thesel is the pointer to the routine which the pointer will be changed to.

The possible values of select are:

1. InitFunc—change the initialization routine pointer
2. GzinFunc—change the input routine pointer
3. GzouFunc—change the output routine pointer
4. ContFunc—change the control routine pointer
5. DestFunc—change the "destroy" routine pointer This function does not affect the variants of a function-object; it is intended to allow programmers the ability to temporarily use routines for "special cases" that the defined variants do not cover. For example, a function-object may have all its variants set for the use of DECWindows, yet there may be a single situation where a function-object may need to briefly use SMG routines. The programmer can set the situation where a function-object may need to briefly use SMG routines. The programmer can set the output function to the SMG routine, run the routine, then switch it back to the ordinarily used DECWindows routine once the SMG routine is completed. Care should be used when using SetRoutine, because once a routine pointer is changed it remains pointing to the new routine until a subsequent call to SetRoutine, SetAllRoutines, or SetVariant changes the routine pointer to its original value.

4.4(e) SetAllRoutines

"SetAllRoutines" performs the same function as "SetRoutine", except that it sets all the function-object's routine pointers to new routines. In effect, it creates a new variant of the function-object without effecting the variants that the programmer has already defined.

The prototype for "SetAllRoutines" is:

```
void SetAllRoutines(Function the_func,void((*initf)()),void((*getf)()),
        void((*displf)()),void((*undisf)()),void((*destf)()))
``` where "the_func" is the function-object, and "initf", "getf", "displf", "undisf", and " destf" are the new initialization routine, input routine, output routine, control routine, and destroy routine, respectively.

As with "SetRoutine", this function should be used carefully since the new routine pointer settings will not change until a subsequent call to "SetAllRoutines" or "SetVariant" is made.

4.4(f) GetVariant

The programmer uses this function when it is necessary to determine which variant the function-object is currently in. Its prototype is as follows:

```
int GetVariant(Function the_func)
``` where "the_func" is the function-object whose variant is needed.

4.4(g) SetVariant

When the programmer wishes to change the function-object's behavior, he/she does so by using "SetVariant".

"SetVariant" has the following prototype:

```
void SetVariant(Function the_func,int newvar)
``` where "the_func" is the function-object whose variant will change, and "newvar" is the number of the variant the object will switch to.

The variant number must be one that the programmer has defined prior to calling "CreateFunction". Through the use of SetVariants, the programmer can invoke specific combinations of code appropriate to his special needs. In other words, through the use of SetVarient and RunRoutine, a programmer can call not just a preexisting piece of code, but a custom assembly of preexisting building blocks corresponding to the particular variant selected.

For more information on defining variants, see the examples section of this document.

4.4(h) DestroyFunction. This function runs the "destroy" routine associated with a function-object, then destroys the function-object. It has the prototype:

```
void DestroyFunction(Function the_func)
``` where "the_func" is the function-object to be "destroyed".

4.5 DETAILED EXAMPLE OF THE CREATION OF A FUNCTION-OBJECT AND THE IMPLEMENTATION OF AN APPLICATION USING THAT FUNCTION-OBJECT

The following sections describe one embodiment of the present invention wherein the methods described above are used to create a function-object and implement an application using that function-object.

The following example explains how a DECWindows based file display/print application entitled DISPVIEW may be implemented through the use of function-objects.

As discussed above, there are essentially five steps that one may follow to create a function-object based application in accordance with the present invention. Each of the five steps is discussed below relative to the present example.

4.5(a) Defining the Required Function-Objects

As noted above, this step is the simplest yet sometimes the most difficult step in the creation of a function-object based application. All that this step requires is that the designer/programmer think about what functions the application will perform. A function-object is then associated with each function that is determined. By requiring the programmer/designer to associate a function-object with each function, this step inherently simplifies the architecture of most applications.

FIG. 9 generally illustrates the purpose of the example application DISPVIEW. Basically, the application DISPVIEW must be able to take a file, and upon request by the user, display that file either on a printer or a DECWindows display screen. Calling a printer a "display" device may seem unorthodox to some, but for purposes of clarity of example that is what it is called herein. Thus, the application DISPLAY performs only one function, that of displaying a file, but should be capable of performing that function on two different devices, i.e., the printer and the screen.

Because the application of the present example, DISPVIEW, is required to perform only one function, i.e., the display of the contents of a file, only one function-object is required. This function-object is referred to herein as "viewfunc." Because there are two devices on which the display may occur, i.e., printer or screen, there must be two variants to function-object viewfunc.

4.5(b) Creating the Data Structures and Function Pointers Necessary for the Defined Function-Objects After determining the function-object that is required for DISPVIEW, the next step is to create the data structures, or the operational data, that function-object "viewfunc" will use. In this step the routines that will perform the functions for the function-object viewfunc are also determined.

Code listing II, attached to the end of this specification, sets out the data structure and function pointer definitions necessary to create the function-object viewfunc.

For ease of discussion, the code listing for creating the data structures and function pointer necessary to create viewfunc is divided into seven sections.

The first section contains definitions for the function-object variants. Since it was determined in step one that two variants are needed for viewfunc, two display variants are defined in this section: the screen display variant, DISPVAR, and the printer variant, PRINTVAR. As noted, each variant is defined by a given variant number, with DISPVAR being defined as variant number 1 and PRINTVAR defined as variant number 2. As discussed below, these variant numbers are used to index the arrays of functions which will be defined in section seven of this code listing. Notably, neither of the defined variants is given the variant number zero since all function-objects have a base variant which is automatically set to zero.

Section two of code listing II defines the total number of variants that the function-object will have. Since viewfunc has three variants (the two defined in section one plus the one base variant) the number of variants for viewfunc is defined as three. This number is, in effect, an array size and is used in an array of function pointers to be defined below to represent the different routines associated with the variants.

Section three of code listing II is not directly related to the creation and implementation of function-object viewfunc, but is included in this example for purposes of completeness. The definitions set out in section three are used to define the status of a DECWindows handler that may be used with the application DISPVIEW. Basically, this section defines reasons for exiting an event loop, discussed below. Defining these reasons allows for more flexibility in the event handlers than DECWindows normally provides.

Section four of code listing II contains the programmer-defined data structure that will serve as the function-object viewfunc's operational data. This data structure contains everything that viewfunc needs to perform its function including, for the particular application discussed in this example, DECWindows widgets, the name of the file to be read, the size of the file, and a "file read" flag which tells if the file has been read.

Section five of code listing II contains a definition of the "class" of function-object viewfunc. This definition will be passed to the special function "CreateFunction" to actually create the function-object viewfunc. Note that the "class" of the function-object viewfunc in this embodiment is defined as the size of the operational data.

Section 6 of code listing II sets forth a list of definitions defining function routines for the various routines that function-object viewfunc will need to perform its desired function. A more detailed discussion how each of these routines operates is included in the discussion of example code listing III.

The last section, section 7, of code listing II is a series of five functional arrays that will be passed to function-object viewfunc through "CreateFunction." Each of the arrays represents one of the five routines (Initialization, gzinta, gzouta, control, and destroy) that will be part of the function-object viewfunc. Notably, each element in the array is associated with a variant, either BASEVAR, PRINTVAR, or DISPVAR, which is indexed according to the definitions made in Section 1 of code listing II. Further note that all of the array entries correspond to function routines that were defined in step 6 of code listing II.

The first array of the five, "initialization" contains the initialization pointers. Note that for each variant (except for the base variant) the pointer point to the same initialization routine (initialize_dwobject). The second array, "file_input," contains pointers to the "gzinta" routines. Unlike the initialization routines, the function pointer for each variant point to a different routine. The same is true for the third array, "file_output." This array contains the pointers to the "gzouta" routines for each variant. The control and destroy routines are pointed to by entries in the "file control" and "file_cleanup" arrays respectively. These pointers are "stubbed" because there will be no programmer defined routines associates with them.

After all the definitions set out in Sections 1–7 of code listing II are made, all of the data structures and function pointers necessary to implement DISPVIEW using the function-object viewfunc have been defined. At this point all that is necessary to implement the application is to write the code for the various routines that were defined in section 6 of code listing II and pointed to in the array defined in section 7.

Code listing III attached to the end of this specification sets forth the code necessary to implement all of the routines defined and pointed to in sections 6 and 7 of code listing II. Code listing III also contains some of the support functions like call back functions, font setting functions, and message display functions. Because these routines are set out in detail in code listing III they will not be discussed at depth here. A few points, however, should be made.

First, it should be noted that all of the routines defined in code listing III, regardless of what variant they are associated with, receive as their argument the data structure defined in Section 4 of code listing II. Note also the compartmentalization of functions that the various routines provide. For example, the routine "initialize_dwobjects" creates all the DECWindows widgets that will be used by either variant of viewfunc to implement the functions required by the application DISPVIEW. Further note that where the different variants require different routines, the functions are even further compartmentalization. For example, the "gzinta" routines for DISPVAR and PRINTVAR are different. As such, there are two different routines, "get_file_contents" and "get_printer_info," each solely responsible for getting the information that their respective variants will require to perform their functions.

4.5(c) Creation of the Function-Object

The creation of the function-object viewfunc is a simple matter and is shown in the MAIN routine of code listing IV. Once all of the above definitions have been made, all that is necessary to create the function-object is to call the routine "CreateFunction" from the function-object interface and provide the routine the appropriate arguments, i.e., the class "DisplayClass", the initial screen variant "DISPVAR", and the various array which represent the initialization, gzinta, gzouta, control, and destroy routines. The initial selection of the screen variant, DISPVAR, in this example ensures that upon startup the application DISPVIEW will read and display on the screen the contents of the file.

4.5(d) Use of the Functions Associated With the Function-Object

In order to use the function associated with the function-object, the programmer may write a MAIN routine that includes a WHILE loop that makes a RunRoutine call to the function-object. Such a MAIN routine, written in the C programming language, for the application DISPVIEW is illustrated in code listing IV attached to the end of this specification.

As will be noted from a review of the code listing, the MAIN program first creates the function-object with a call to CreateFunction and then enters a WHILE loop which runs the function-object's input (gzinta) and output (gzouta) routines. Since one of these routines always enters a DECWindows event handler, refer to code listing III, and the user can exit the event loop by clicking on certain buttons, the WHILE loop always checks to discover the "reason"

why the event loop was exited. If the user did not click on the "exit" button, then the function-object switches variants.

Note that in the specific example of code listing IV the function-object toggles between the display and print variants using "SetVariant" to change itself appropriately. Further note that the interface to the function-object does not change, although the user will see a radical change when he switches between the file display screen and the print screen. It is this ability to dynamically switch between variants that makes an application using function-objects so versatile and flexible. The interface to the function-object is simple, yet is capable of integrating code that can handle two different, incompatible devices.

4.5(e) Destruction of the Function-Object

Like the creation of a function-object, the destruction of a function-object is a relatively simple thing. All that must be done to destroy function-object viewfunc is to call the "DestroyFunction" routine from the function-object interface prior to executing the application. This step is illustrated in the MAIN routine of code listing IV.

4.6 SOME USES AND ADVANTAGES OF FUNCTION-OBJECTS

Function-objects may be used effectively in applications that must interface with two or more different kinds of applications or devices. For example, an application designed to use DECnet and TCP-IP protocols is a prime candidate for implementation using function-objects. Another application in which function-objects can be used is one which outputs to different types of printers. Function-objects are also useful in creating applications that can build displays on different types of screens (terminals, workstations, etc.), or applications which must integrate the different functions of other applications. Some of the advantages of using function-objects over most other design methods include modularity of code, flexibility of applications, reusability of existing code, and ease of design.

Modularity is a benefit of most object oriented tools; function-objects are no exception. The practice of grouping together function pointers and assigning these pointers to specialized routines for input, output, creation, control, and destruction automatically introduces a level of modularity to any application. Each routine associated with a function-object is isolated from other routines; when it is necessary to change their operation, the user need simply change the function pointers. The routines in one variant of a function-object operate without affecting the operation of the routines of any other variant. This means that users can add new functionality to an application easily without affecting existing functions, and can change old functions with minimum impact on the rest of the application.

Indeed, it is anticipated that the benefits of modularity may extend to other disciplines that make use of computer programs. For example, it is envisioned that common bookkeeping and accounting operations such as computing payroll taxes, printing payroll checks, and the like could readily be organized along function-object lines to permit the design and use of snap-in modules to handle different subtasks associated with a specific operation. A standard-setting body in a particular discipline could define a standard set of operations, subtasks, and required data structures in terms of the function-object interface. This could permit an end-user in that discipline to mix and match program routines, possibly written by different vendors, to handle discipline-specific operations as desired.

Adaptability follows in many ways from modularity. Function-object variants enable users to create applications which are flexible enough to adapt themselves to virtually any device, protocol, or user environment. A function-object based application that must use different formats for communicating with different devices simply uses different variants of function-objects for each device. Such an application switches to the variants that are appropriate for the device it communicates with, and changes to a different variant when dealing with a different device.

Re-use of code is another advantage of the function-object approach. With minor adjustments, existing code can be adapted for use in a function-object. All that is required is to move any existing dam structures or arguments used by existing code into the function-object's operational data, and to make all references to the data structures reference the function-object. This adapts existing code to a function-object without making any major changes to the code itself.

The use of function-objects thus can reduce most of the problems associated with the design of complex applications. An application designer who uses function-objects need concentrate only in two areas: (1) the functions the application will perform, and (2) the data that these functions need to use. This simplifies the design process considerably. The implementation of a design is also simplified since the use of function-objects almost forces the user to write code which strictly follows the design.

CODE LISTING I
EXAMPLE -- FUNCTION-OBJECT INTERFACE

```
/************************************************************\
*
*            *** DIGITAL CONFIDENTIAL MATERIAL ***
*
* Copyright (c) Digital Equipment Corporation, 1990
* All Rights Reserved.  Unpublished rights reserved
* under the copyright laws of the United States.
*
* The software contained on this media is proprietary
* to and embodies the confidential technology of
* Digital Equipment Corporation.  Possession, use,
* duplication or dissemination of the software and
* media is authorized only pursuant to a valid written
* license from Digital Equipment Corporation.
*
* RESTRICTED RIGHTS LEGEND   Use, duplication, or
* disclosure by the U.S. Government is subject to
* restrictions as set forth in Subparagraph (c)(1)(ii)
* of DFARS 252.227-7013, or in FAR 52.227-19, as
* applicable.
*
\************************************************************/

/*
* FUNCSTUF.C -- Function Object control functions
*
*                   For Digital Equipment Corporation
*                   by Robert Brown III
*                   September 20, 1990
*
*       THIS FILE AND ITS CONTENTS ARE MARKED DIGITAL CONFIDENTIAL
*
* This file contains the main functions that are used to create, run, change,
* and destroy function objects. Through the functions listed in this file
* a programmer can completely control hir function objects.
*
* The functions in this file are:
*
* SETUPENVIRONMENT -- Create the top level Function Object
* CREATEFUNCTION -- Create a new Function Object
```

* RUNROUTINE -- Run a Function Object's routine
* SETROUTINE -- Set routines associated with a Function Object
* SETALLROUTINES -- Set all routines associated with a function object
* GETVARIANT -- Get a function object's variant
* SETVARIANT -- Set a function object's variant
* DESTROYFUNCTION -- Eliminate a function object
* CLEANUPENVIRONMENT -- Remove the "environment" object (probably obsolete)
* BASIC_STUB -- Do nothing routine (possibly obsolete)
*
* For more information on how to use these functions, see the document titled:
* "Function Object Specification" by Robert Brown III
*/
include <stdio.h>
include "comclass.h"

Function SetupEnvironment();
Function CreateObject();

/*
 * Below is the data structure for the Function Objects. This is the central
 * structure used in all routines and operations related to them.
 */
typedef struct function_structure
{
    short classnum;     /* The Class number of the Function Object    */ int datasize,       /* The size of the private data structure     */
        variant;        /* The Function Object's "variant"            */

BASEDATPTR operdat; /* Points to the private data of the object   */

/*
 * The pointers below represent various operations that will be used by
 * these function objects. These are the active operations that are selected
 * from the arrays of functions defined in the next group of pointers.
 */
    void ((*init_routine)());
    void ((*gzinta_routine)());
    void ((*gzouta_routine)());
    void ((*control_routine)());
    void ((*destroy_routine)());

/*
 * The pointers below point to arrays of functions that are defined by the
 * programmer (see the documentation on how to set up the definitions).
 */

```
    void ((**initsel)());
    void ((**gzinsel)());
    void ((**gzousel)());
    void ((**contsel)());
    void ((**destsel)());

/*
 * And of course, the inevitable pointers.
 *
 * NOTE: Nothing is really done with these yet, so applications SHOULD NOT
 *       DEPEND ON THEM YET.
 */
    Function child,
             next,
             previous;
} Func;
/*
 * End of Function Object structure.
 */ short screenflag;

/*
 * SETUPENVIRONMENT -- Create the top level Function Object
 *
 * This function creates an environment. It should be the first function
 * called if any of the other Function Executive functions are to be used. The
 * environment itself is a function object, which (a) is the parent function
 * object for all other function objects, (b) sets up the screen in
 * the manner appropriate to the type of display that was selected for the
 * application and/or (c) opens any and all devices or ports that the
 * application requires.
 *
 * The SETUPENVIRONMENT function accepts the following arguments:
 *
 * 1: A flag indicating the function object class
 * 2: A pointer to the function object's initialization routine
 * 3: A pointer to the function object's input routine
 * 4: A pointer to the function object's output routine
 * 5: A pointer to the function object's "control" routine
 * 6: A pointer to the function object's "destroy" routine
 *
 *
 * Note that all function object pointers can point to actual functions or
 * can be NULL pointers.
 *
```

```
 * Upon invocation, SETUPENVIRONMENT first allocates the memory space for the
 * function object, then selects the type of structure required for the
 * display pointer and allocates memory for it. If the initialization routine
 * is not a NULL pointer, SETUPENVIRONMENT runs it.
 *
 * Upon successful completion, SETUPENVIRONMENT returns a pointer to the created
 * function object. If either of the memory allocations fail, SETUPENVIRONMENT
 * returns a NULL pointer.
 */
Function
SetupEnvironment(short classtyp,void ((*initf)()),void ((*getf)()),
                 void ((*displf)()),void ((*undisf)()),void ((*destf)()))
{
    Function s_func;   /* Points to the new "function object"    */

/*
 * Create the structure which represents the function (the function object).
 * If the attempt to allocate memory for the structure fails, output an error
 * message and return a NULL.
 */
    s_func = (Function)malloc(sizeof(Func));
    if(s_func == NULL)
    {
        /*
         * MALLOC has failed. Inform the user and return.
         */
        printf("Failed to SETUP screen!!!\n");
        return(NULL);
    }

/*
 * Set the data size to the appropriate screen structure.
 */
    s_func->datasize = classtyp;

/*
 * Create the "screen function" structure. If the attempt to allocate memory
 * for the structure, output an error message and return a NULL.
 */
    s_func->operdat = (BASEDATPTR)malloc(s_func->datasize);
    if(s_func->operdat == NULL)
    {
        /*
         * MALLOC has failed. Inform the user and return.
         */
        printf("Cannot SELECT this screen type!!\n");
```

```
        return(NULL);
    }

/*
 * Set the object's function pointers to the functions selected.
 */
    s_func->init_routine    = initf;
    s_func->gzinta_routine  = getf;
    s_func->gzouta_routine  = displf;
    s_func->control_routine = undisf;
    s_func->destroy_routine = destf;

/*
 * Now initialize the child and other pointers.
 *
 * Note: in Version 1.0 of this software, these pointers are not yet used.
 *       I suspect that I will use them eventually in a later version.
 *
 *                                              -RB3 9/18/90
 */
    s_func->child    = NULL;
    s_func->next     = NULL;
    s_func->previous = NULL;

/*
 * If an initialization function has been selected for this object, run it.
 */
    if(s_func->init_routine != NULL)
    {
        (*s_func->init_routine)(s_func->operdat);
    }

/*
 * All is well. Return a pointer to the function object.
 */
    return(s_func);
}
/*
 * End of SETUPENVIRONMANT.
 */

/*
 * CREATEFUNCTION -- Create a new Function Object
 *
 * The following arguments are received by CREATEFUNCTION:
 *
```

* 1: The Class Number (representing the type of Object) that will be created
* 2: The Variant of the Function Object
* 3: A pointer to an array of initialization routines
* 4: A pointer to an array of Input routines ("Guzinta" routines)
* 5: A pointer to an array of Output routines ("Gzouta" routines)
* 6: A pointer to an array of Control routines
* 7: A pointer to an array of "Destroy" routines
* 8: A pointer to a possible parent (Usually NULL, for now)
*
* Note: For a more detailed explanation of why the arguments passed to
*       CREATEFUNCTION are in the form they are, read the document "Function
*       Object Specification" by Robert Brown III
*
* When invoked, CREATEFUNCTION allocates memory for the Function Object, then
* allocates memory for whatever operational data is required by the Object.
* The Object's pointers to the various routine arrays (variants) are
* initialized, and the routine pointers are initialized to those routines
* associated with the chosen variant. If an initialization routine for the
* Function Object was defined, then that routine is called.
*
* Upon successful completion, CREATEFUNCTION returns a pointer to the newly
* created Function Object. Upon failure, an error message is printed out and
* a NULL pointer is returned.
*
* NOTE: The printing out of the error message is a KLUDGE, put in because I
*       am too lazy right now to put in a decent error- handling routine. At
*       some point, I will create a decent error- handling package for this
*       system. Fortunately, for now errors in this function only occurr when
*       MALLOCs fail. Hopefully that is an extremely rare occurrance.
*/
Function
CreateFunction(short class,short var,void ((*initf[])()),void ((*gzinf[])()),
               void ((*gzouf[])()),void ((*contf[])()),void ((*destf[])()),
               Function parent)
{
  Function f_object; /* Points to the new "function object"      */

/*
 * Create the structure which represents the function (the function object).
 * If the attempt to allocate memory for the structure fails, output an error
 * message and return a NULL.
 */
  f_object = (Function)malloc(sizeof(Func));
  if(f_object == NULL)
  {
      /*

```
         * MALLOC has failed. Inform the user and return.
         */
        printf("Failed to allocate MEMORY for Object!!!\n");
        return(NULL);
    }

/*
     * Set the data size to the appropriate screen structure.
     */
    f_object->datasize = class;

/*
     * Store the selected variant of the object.
     */
    f_object->variant = var;

/*
     * Create the "screen function" structure. If the attempt to allocate memory
     * for the structure, output an error message and return a NULL.
     */
    f_object->operdat = (BASEDATPTR)malloc(f_object->datasize);
    if(f_object->operdat == NULL)
    {
        /*
         * MALLOC has failed. Inform the user and return.
         */
        printf("Cannot SELECT this operational data type!!\n");
        free(f_object);
        return(NULL);
    }

/*
     * Store the pointers to the functions that the variant number will reference.
     */
    f_object->initsel = initf;
    f_object->gzinsel = gzinf;
    f_object->gzousel = gzouf;
    f_object->contsel = contf;
    f_object->destsel = destf;

/*
     * Set the object's function pointers to the functions selected.
     */
    f_object->init_routine = f_object->initsel[var];
    f_object->gzinta_routine = f_object->gzinsel[var];
    f_object->gzouta_routine = f_object->gzousel[var];
```

```
    f_object->control_routine = f_object->contsel[var];
    f_object->destroy_routine = f_object->destsel[var];

/*
     * If this is the parent's first child, set this object accordingly.
     */
    if(parent != NULL)
    {
        if(parent->child == NULL)
        {
           parent->child = f_object;
           f_object->previous = NULL;
        }
    }
    f_object->next = NULL;

/*
     * If an initialization function has been selected for this object, run it.
     */
    if(f_object->init_routine != NULL)
    {
        (*f_object->init_routine)(f_object->operdat);
    }

/*
     * All is well. Return a pointer to the function object.
     */
    return(f_object);
}
/*
 * End of CREATEFUNCTION.
 */

/*
 * RUNROUTINE -- Run a Function Object's routine
 *
 * The function coded below "runs" one of the routines associated with a
 * Function Object.
 *
 * This function receives the following arguments:
 *
 * 1: A pointer to the Function Object whose routine is to be run
 * 2: A selection flag telling which routine is to be executed
 *
 * RUNROUTINE selects the routine to be run based on the value of the
 * selection flag. If the pointer to the routine is not NULL, RUNROUTINE passes
```

```
 * control to that routine.
 *
 * The definitions for the possible selection flag values are given in
 * COMCLASS.H.
 *
 * Nothing is returned from this function.
 */
void
RunRoutine(Function the_func,short select)
{
    void ((*runner)());      /* The routine that will be executed    */

/*
 * Set the routine pointer to the appropriate routine.
 */
    switch(select)
    {
      case InitFunc:         /* Selected Initialization routine     */
          runner = the_func->init_routine;
      break;

case GzinFunc:         /* Selected data aquisition routine    */
          runner = the_func->gzinta_routine;
      break;

case GzouFunc:         /* Selected display routine            */
          runner = the_func->gzouta_routine;
      break;

case ContFunc:         /* Selected "undisplay" routine        */
          runner = the_func->control_routine;
      break;

case DestFunc:         /* Selected destroy routine            */
          runner = the_func->destroy_routine;
      break;
    }

/*
 * If the selected routine points to an actual function, execute it.
 */
    if(runner != NULL)
    {
        (*runner)(the_func->operdat);
    }
}
```

```
/*
 * End of RUNROUTINE.
 */

/*
 * SETROUTINE -- Set routines associated with a Function Object
 *
 * This function receives the following arguments:
 *
 * 1: The Function Object whose routine will be changed
 * 2: A selection flag
 * 3: A pointer to the routine to
 *
 * The SETROUTINE function sets one of the function object's routine pointers
 * to a new value. The routine pointer to be changed is selected by the
 * selection flag, whose values are described in COMCLASS.H.
 *
 * Nothing is returned from this function.
 */
void
SetRoutine(Function the_func,short select,void ((*thesel)()))
{
/*
 * Change the routine indicated by the selection flag.
 */
  switch(select)
  {
    case InitFunc:    /* Change initialization routine    */
        the_func->init_routine = thesel;
    break;

case GzinFunc:  /* Change input routine               */
        the_func->gzinta_routine = thesel;
    break;

case GzouFunc:  /* Change output routine              */
        the_func->gzouta_routine = thesel;
    break;

case ContFunc:  /* Change control routine             */
        the_func->control_routine = thesel;
    break;

case DestFunc:  /* Change destroy routine             */
        the_func->destroy_routine = thesel;
    break;
```

```
      }
   }
/*
 * End of SETROUTINE.
 */

/*
 * SETALLROUTINES -- Set all routines associated with a function object
 *
 * The SETALLROUTINES function is similar to the SETROUTINES function, except
 * that it sets all the routine pointers associated with a function object to
 * new values. It receives the following arguments:
 *
 * 1: The function object whose pointers will be changed
 * 2: The new initialization routine pointer
 * 3: The new input routine pointer
 * 4: The new output routine pointer
 * 5: The new control routine pointer
 * 6: The new destroy routine pointer
 *
 * Each routine pointer is changed to the associated new value. Nothing is
 * returned from SETALLROUTINES.
 */
void
SetAllRoutines(Function the_func,void ((*initf)()),void ((*getf)()),
            void ((*displf)()),void ((*undisf)()),void ((*destf)()))
{
  /*
   * Set the function object's routines to their new values.
   */
   the_func->init_routine = initf;
   the_func->gzinta_routine = getf;
   the_func->gzouta_routine = displf;
   the_func->control_routine = undisf;
   the_func->destroy_routine = destf;
}
/*
 * End of SETALLROUTINES.
 */

/*
 * GETVARIANT -- Get a function object's variant
 *
 * This function receives a pointer to a function object, and returns the
 * variant number of the object.
 */
```

```
int
GetVariant(Function the_func)
{
 /*
  * Return the variant number.
  */
    return(the_func->variant);
}
/*
 * End of GETVARIANT.
 */

/*
 * SETVARIANT -- Set a function object's variant
 *
 * This function sets a function object's variant by setting each of the
 * object's routines to the routines referenced by the variant number. Its
 * arguments are:
 *
 * 1: A pointer to the function object
 * 2: The variant number
 *
 * The variant number is defined by the user (see the document "Function Object
 * Specification" by Robert Brown III). It is used as an index into the array
 * of routines that was defined when the object was created.
 *
 * Nothing is returned from this function.
 */
void
SetVariant(Function the_func,int newvar)
{
 /*
  * Set the function object's routines to the routines referenced by the
  * variant number.
  */
    the_func->init_routine    = the_func->initsel[newvar];
    the_func->gzinta_routine  = the_func->gzinsel[newvar];
    the_func->gzouta_routine  = the_func->gzousel[newvar];
    the_func->control_routine = the_func->contsel[newvar];
    the_func->destroy_routine = the_func->destsel[newvar];
}
/*
 * End of SETVARIANT.
 */

/*
```

```
 * DESTROYFUNCTION -- Eliminate a function object
 *
 * This function receives a pointer to the function object to be "destroyed".
 * If the function object has a "destroy" routine associated with it, this
 * destroy routine is called. The memory allocated to the Operational Data is
 * freed, then the memory for the function object itself is freed.
 *
 * Nothing is returned from DESTROYFUNCTION.
 *
 */
void
DestroyFunction(Function the_func)
{
/*
 * If the function object has a destroy routine, call it.
 */
  if(the_func->destroy_routine != NULL)
  {
      (*the_func->destroy_routine)(the_func->operdat);
  }

/*
 * Free up the operational data and the function object.
 */
  free(the_func->operdat);
  free(the_func);
}
/*
 * End of DESTROYFUNCTION.
 */

/*
 * CLEANUPENVIRONMENT -- Remove the "environment" object (probably obsolete)
 *
 * CLEANUPENVIRONMENT works the same as DESTROYFUNCTION and receives the same
 * argument.It was originally intended to handle screen environments, but a
 * future iteration of it should eliminate all function objects. In theory,
 * this function will be the last function object related function to be called
 * in an application. New Function object based applications should use
 * DESTROYFUNCTION since this function will eventually change.
 */
void
CleanupEnvironment(Function scrfunc)
{
   if(scrfunc->destroy_routine != NULL)
```

```
    {
        (*scrfunc->destroy_routine)(scrfunc->operdat);
    } free(scrfunc->operdat);
    free(scrfunc);
}
/*
 * End of CLEANUPENVIRONMENT.
 */

/*
 * BASIC_STUB -- Do nothing routine (possibly obsolete)
 *
 * Right now this is sometimes used in variant definitions. It should not
 * be used in new applications.
 */
void
basic_stub(BASEDATPTR nofunc)
{
    /*
     * This is a stub which does nothing for now. When/If I think of
     * anything anyone can do with a base class, I shall add code to this stub.
     *
     *                                          -RB3 3/21/90
     */
}
/*
 * End of BASIC_STUB.
 */ void
DataSetKludge(Function the_func,char *block)
{
}

BASEDATPTR
DataGetKludge(Function the_func)
{
    return(the_func->operdat);
}
```

```
/*
 * COMCLASS.H -- Common Structures for all Function Objects
 *
 *       THIS FILE AND ITS CONTENTS ARE MARKED DIGITAL CONFIDENTIAL
 *
 * This file contains the defines, typedefs, and data structures that will be
 * used in the object- oriented version of the PCSA User Interface.
 *
 * The idea behind this is that each function on PCSA can be treated as an
 * "object" in much the same way that some screen handlers (such as MACINTOSH
 * windowing system, OS/2's Presentation Manager, and the Xt Toolkit) treat
 * "widgets" as objects. The intention here is to create PCSA Function
 * "objects" that will be flexible enough to be used in all types of screen
 * handlers (Notably VIEWS and DECWindows) and handle the functions of most
 * (if not all) of the different servers that Digital may have to interface to.
 */

/*
 * The Defines below tell which function to set.
 */
#define InitFunc    0     /* The initialization function    */
#define GzinFunc    1     /* The "get data" function (Guzinta)   */
#define GzouFunc    2     /* The data output function (Guzouta) */
#define ContFunc    3     /* The controller function        */
#define DestFunc    4     /* The "destroy" function         */

/*
 * Below is the Base Variant number definition
 *
 *                  *WARNING*
 *
 * Never give a screen or function object class or variant a number of zero
 * since those are for the base class only!!
 */
#define BASEVARIANT 0
#define BASEDATCLASS 0

/*
 * The structure defined below should be useable as the "data abstraction"
 * that will be useable with different screen handling packages. Screen data
 * and function pointers for screen handling should be placed here.
 */
```

```c
typedef struct basic_screen_abstraction
{
    int scrclass;              /* Common all types of data        */

} BASEDAT, *BASEDATPTR;

#define BaseData sizeof(BASEDAT)

/*
 * And the structure below puts everything together!
 */
typedef struct function_structure *Function;

/*
 * Below are some prototypes for the functions related to Function Objects.
 */
extern Function SetupEnvironment(short classtyp,void ((*initf)()),
                    void ((*getf)()),void ((*displf)()),
                    void ((*undisf)()),void ((*destf)()));
extern Function CreateFunction(short class,short var,void ((*initf[])()),
                    void ((*gzinf[])()),void ((*gzouf[])()),
                    void ((*contf[])()),void ((*destf[])()),
                    Function parent);
extern void SetRoutine(Function the_func,short select,void ((*thesel)()));
extern void RunRoutine(Function the_func,short select);
extern void SetAllRoutines(Function the_func,void ((*initf)()),void ((*getf)()),
                    void ((*displf)()),void ((*undisf)()),
                    void ((*destf)()));
extern int GetVariant(Function the_func);
extern void SetVariant(Function the_func,int newvar);
extern void DestroyFunction(Function the_func);
extern void CleanupEnvironment(Function scrfunc);
extern void basic_stub(BASEDATPTR nofunc);
extern void DataSetKludge(Function the_func,char *block);

extern BASEDATPTR DataGetKludge(Function the_func);
```

CODE LISTING II
EXAMPLE -- FUNCTION POINTERS DEFINITIONS

```
*
* Copyright (c) Digital Equipment Corporation, 1990
* All Rights Reserved. Unpublished rights reserved
* under the copyright laws of the United States.
*
*
*
*
*
*
*
*
*
* RESTRICTED RIGHTS LEGEND  Use, duplication, or
* disclosure by the U.S. Government is subject to
* restrictions as set forth in Subparagraph (c)(1)(ii)
* of DFARS 252.227-7013, or in FAR 52.227-19, as
* applicable.
*
\*****************************************************************/

/*
* Section 1:
*
* List some variant numbers.
*
*              *WARNING*
*
* Never give a function object variant a number of zero since those
* are for the base class only!!
*/
#define DISPVAR 1
#define PRINTVAR 2

/*
* Section 2:
*
* This definition is the number of variants to be created by the programmer.
* It is programmer- definable (of course) and is used in an array of
* function pointers that represents the vaarious routines associated with the
* variants.
*
* This is, in effect, an array size. Its value should be the number of user-
* defined variants plus one (to include the base variant).
*/
#define VIEWER_VARIANTS 3
```

```c
/*
 * Section 3:
 *
 * The definitions below are "reasons" for exiting the event loop (See
 * SCREENF.C). Creating exit "reasons" enables us to have more flexibility in
 * our event handlers than DECWindows normally provides. Check out the main
 * routine in order to see how the "reasons" are used.
 */
#define ChangeFunction  0     /* Change the application's function  */
#define ExitProgram     1     /* Speaks for itself                  */
#define DoAPrint        2     /* A print command was affirmed       */
#define CancelPrint     3     /* A print command was cancelled      */

/*
 * Section 4:
 *
 * Below is the user- defined data structure which will be used in the
 * DECWindows- based function object. Note that the programmer can put
 * anything hir wishes in the user- defined data structure and can call the
 * structure anything hir wants as well. This is a major aspect of the
 * flexibility of the use of function objects.
 */
typedef struct the_display_data
{
  Widget topwidge,      /* The Toplevel Widget                     */
    dialogbox,  /* The application is a Dialog Box widget    */
    mainwind,   /* This bounds and contains the VLIST widget */
    workwidge,          /* The VLIST Scroll Window widget          */
    mainprt,    /* Another main window widget for printing   */
    workprt,    /* Another VLIST widget. Displays queues     */
    gobutt,     /* Tells the application to do the printing  */
    selectbut,  /* The button which switches between operations */
    quitbut;    /* The "Quit Application" button             */ char filename[80];    /* The name of the file                    */
  int filesize,    /* The size of the file                    */
      fileread;   /* Tells if the file has been read         */

} DisplayDat,*DisplayData;
/*
 * End of user- defined data structure.
 */

/*
 * Section 5:
 *
 * The definition below is mostly for convenience. When the function object is
 * created (see the MAIN routine), this will be the "class" argument of the
 * call to "CreateFunction".
 */
#define DisplayClass sizeof(DisplayDat)
```

```
/*
 * Section 6:
 *
 * Below are some prototypes that will be used as function object routines
 * (see the next section of this file).
 */
extern void initialize_dwobject(DisplayData thedisp);
extern void display_dwobject(DisplayData thedisp);
extern void get_file_contents(DisplayData thedisp);
extern void get_printer_info(DisplayData thedisp);
extern void activate_printer(DisplayData thedisp);

/*
 * Section 7:
 *
 * The functions prototyped above are placed into arrays of function pointers
 * as shown below. Note that each array MUST begin with a pointer to the
 * BASIC_STUB routine in order to accomodate the function object's base
 * variant.
 *
 * Note that the names of these arrays are user- definable. The size of each
 * array depends on the number of variants created for the function object.
 * Each element in the array represents a variant's routine.
 *
 * The first array (directly below) represents the variants for the
 * initialization routine.
 */
void (*(initialization[VIEWER_VARIANTS]))() =
{
    basic_stub,             /* The base variant              */
    initialize_dwobject,    /* The "screen display" variant  */
    initialize_dwobject,    /* The "printer" variant         */
};

void (*(file_input[VIEWER_VARIANTS]))() =
{
    basic_stub,             /* The base variant              */
    get_file_contents,      /* The "screen display" variant  */
    get_printer_info,       /* The "printer" variant         */
};

void (*(file_output[VIEWER_VARIANTS]))() =
{
    basic_stub,             /* The base variant              */
    display_dwobject,       /* The "screen display" variant  */
    activate_printer,       /* The "printer" variant         */
};

void (*(file_control[VIEWER_VARIANTS]))() =
{
    basic_stub,             /* The base variant              */
    basic_stub,             /* The "screen display" variant  */
```

```
    basic_stub,              /* The "printer" variant       */
};

void (*(file_cleanup[VIEWER_VARIANTS]))() =
{
    basic_stub,              /* The base variant            */
    basic_stub,              /* The "screen display" variant */
    basic_stub,              /* The "printer" variant       */
};
```

CODE LISTING III
EXAMPLE -- ROUTINE IMPLEMENTATION

```
/*
 * SCREENF.C -- DECWindows Screen Handling Functions
 *
 * This file contains the routines for all variants of the "display a file"
 * function object. It also contains some of the support functions like
 * callback functions, font setting functions, and message display functions.
 *
 * All the functions here use DECWindows in some way or another. If it
 * uses even one DECWindows function, it is in this file.
 *
 * The functions here are:
 *
 * INITIALIZE_DWOBJECT -- Initialize the Display Function Object
 * GET_FILE_CONTENTS -- Read a file
 * DISPLAY_DWOBJECT -- Display the contents of a file
 * GET_PRINTER_INFO -- Printer Queue Selecter
 * ACTIVATE_PRINTER -- The printer startup routine
 * VMAINLOOP -- The main DECWindows event loop
 * VEXITLOOP -- Exit the main event loop
 * VGETEXITREASON -- Get the reason for exiting the event loop
 * VLISTPROC -- Process the VLIST widgets
 * QUIT_SESSION -- Exit the program
 * SELECT -- Function Object variant switcher
 * DONEIT -- Callback for the message box's "Acknowledge" button
 * SELECT_MY_FONT -- Font setting routine
 * GETPRINTERS -- Get a list of printers
 * UPDATE_PRINTER_MESSAGE -- Change the printer status message
 * DISPLAY_PRINTER_MESSAGE_BOX -- Display a printer status message
 *
 * The contents of this file are part of an example program which illustrates
 * the use of Function Objects. For more information, see the document
 * "Function Object Specification" by Robert Brown III.
 */
include <stdio.h>
#include <decw$include/DwtWidget.h>
#include "vlist.h"
#include "comclass.h"
#include "filefunc.h"

extern char **margs;      /* Contains the arguments passed into MAIN   */ extern int argnum;        /* The number of arguments passed to MAIN    */

/*
 * Below are some DECWindows widget callback functions
 */
void vlistproc(),
    quit_session(),
    select(),
    doneit();
```

```c
/*
 * Below are miscellaneous function prototypes.
 */
int update_printer_message();

void VExitLoop(int why);

DwtFontRec *select_my_font();

/*
 * Below are global variables used with this application's event loop.
 */
static int loopflag = 0;    /* Tells when to exit           */
static int reason = 0;      /* Tells why the loop was exited   */

/*
 * Below is the font that will be used in the VLIST widget, and the string
 * containing the printer name.
 */
static char *Vfont = "-Adobe-Courier-Medium-R-Normal--*-120-*-*-M-*-ISO8859-1";
static char printnam[80];

/*
 * INITIALIZE_DWOBJECT -- Initialize the Display Function Object
 *
 * This is an example of a Function Object initialization routine. This routine
 * is designed to prepare a screen for display using DECWindows.
 *
 * Note that the single argument to this "routine" is a pointer to the
 * user- defined "DisplayData" structure. This and all other routines in this
 * file will perform actions on the members of this data structure.
 *
 * In this routine, DECWindows is initialized and the "Widgets" that will
 * be used in the application are created. Note that this application uses
 * an older version of the VLIST widget (Created by Steve Klein) to handle
 * its display.
 *
 * See FILEFUNC.H for more information about the "DisplayData" structure.
 */
void
initialize_dwobject(DisplayData thedisp)
{
    Arg arglist[9];           /* The widget attrubute arguments    */

DwtCallback fcalls[2];    /* The function call structure       */

DwtFontRec *myfont;       /* The font used in the VLIST widgets */

/*
     * Initialize the DECWindows application. Give it its horizontal and
     * vertical position, the ability to be resized, and the ability to
```

```
* accept focus.
*/
thedisp->topwidge = XtInitialize("Viewer/Printer","Keyclass",NULL,0,
                &argnum,margs);
XtSetArg(arglist[0],DwtNx,150);
XtSetArg(arglist[1],DwtNy,300);
XtSetArg(arglist[2],XtNallowShellResize,TRUE);
XtSetArg(arglist[3],DwtNacceptFocus,TRUE);
XtSetValues(thedisp->topwidge,arglist,4);

/*
 * Create a dialog box widget of the size desired for the application.
 */
XtSetArg(arglist[0],DwtNwidth,690);
XtSetArg(arglist[1],DwtNheight,450);
thedisp->dialogbox = DwtDialogBoxCreate(thedisp->topwidge,"DBox",arglist,2);
XtManageChild(thedisp->dialogbox);

/*
 * Create and manage a "Main Window" widget to be used for the file display.
 */
XtSetArg(arglist[0],DwtNwidth,630);
XtSetArg(arglist[1],DwtNheight,340);
XtSetArg(arglist[2],DwtNx,10);
XtSetArg(arglist[3],DwtNy,10);
thedisp->mainwind = XtCreateManagedWidget("Sizer",mainwindowwidgetclass,
                thedisp->dialogbox,arglist,4);

/*
 * Create and manage a "Main Window" widget to be used for the printer
 * selection display.
 */
XtSetArg(arglist[0],DwtNwidth,230);
XtSetArg(arglist[1],DwtNheight,140);
XtSetArg(arglist[2],DwtNx,50);
XtSetArg(arglist[3],DwtNy,10);
thedisp->mainprt = XtCreateManagedWidget("Sizer",mainwindowwidgetclass,
                thedisp->dialogbox,arglist,4);

/*
 * Create the font desired for the "Vlist" widgets.
 */
myfont = select_my_font(thedisp->mainwind);

/*
 * Generate a "file display" VLIST widget.
 */
{
        DwtCallback callbackA[2] = {vlistproc,0,0};
        Arg args[] = {{VListNselectCallback,callbackA},{VListNfont,myfont}};
        thedisp->workwidge = XtCreateManagedWidget("VList",vlistwidgetclass,
                        thedisp->mainwind,args,
```

```
                              XtNumber(args));
}

/*
 * Generate a VLIST widget which displays available printer queues.
 */
{
        DwtCallback callbackA[2] = {vlistproc, 1, 0};
        Arg args[] = {{VListNselectCallback, callbackA},{VListNfont,myfont}};
        thedisp->workprt = XtCreateManagedWidget("VList",vlistwidgetclass,
                                  thedisp->mainprt,args,
                                  XtNumber(args));
}

/*
 * Below is the declaration of the single function which will be called when
 * all buttons (except the "quit" button) are pressed.
 */
fcalls[0].proc = select;
fcalls[0].tag = 0;
fcalls[1].proc = NULL;

/*
 * Create the "do the print" button. DO NOT MANAGE IT.
 */
XtSetArg(arglist[0],DwtNx,90);
XtSetArg(arglist[1],DwtNy,150);
XtSetArg(arglist[2],DwtNactivateCallback,fcalls);
XtSetArg(arglist[3],DwtNlabel,DwtLatin1String("Do Print"));
thedisp->gobutt = DwtPushButtonCreate(thedisp->dialogbox,"Switch",
                          arglist,4);

/*
 * Create the "Switch functions" button and manage it.
 */
fcalls[0].tag = 1;

XtSetArg(arglist[0],DwtNx,50);
XtSetArg(arglist[1],DwtNy,250);
XtSetArg(arglist[2],DwtNactivateCallback,fcalls);
XtSetArg(arglist[3],DwtNlabel,DwtLatin1String("Print"));
thedisp->selectbut = DwtPushButtonCreate(thedisp->dialogbox,"Switch",
                          arglist,4);
XtManageChild(thedisp->selectbut);

/*
 * Set the callback function structure to session quit, and create (and
 * manage) the "quit application" button.
 */
fcalls[0].proc = quit_session;
fcalls[0].tag = 0;
fcalls[1].proc = NULL;
```

```
/*
 * Create the "quit" button.
 */
  XtSetArg(arglist[0],DwtNx,170);
  XtSetArg(arglist[1],DwtNy,250);
  XtSetArg(arglist[2],DwtNactivateCallback,fcalls);
  XtSetArg(arglist[3],DwtNlabel,DwtLatin1String("Quit"));

thedisp->quitbut = DwtPushButtonCreate(thedisp->dialogbox,"Goodbye",
                       arglist,4);
  XtManageChild(thedisp->quitbut);

/*
 * Initialize the file size and the "file read" flag.
 */
  thedisp->filesize = 0;
  thedisp->fileread = 0;
}
/*
 * End of INITIALIZE_DWOBJECT.
 */

/*
 * GET_FILE_CONTENTS -- Read a file
 *
 * This is the "gzinta" routine for the screen variant. It reads the contents
 * of a file (if the user supplied one) and places them, line by line, into
 * the display VLIST widget. If the user does not supply the file name, then
 * the user is prompted for one. If the file cannot be opened or read, then
 * the program exits.
 *
 * The argument to this and all other function object routines is the
 * programmer- defined data structure that was made in FILEFUNC.H. Creating
 * seperate routines in this manner almost forces a programmer to automatically
 * generate modular code -- while retaining some of the advantages afforded
 * by data that is shared across different functions.
 */
void
get_file_contents(DisplayData thedisp)
{
  char inline[150],     /* The input line (read from the file)    */
       dislin[350];     /* The display line (put into the VLIST widget) */ int linelen,          /* Gets the length of lines               */
      lencoun;          /* Used to scan the characters in a line  */ static short imread = 0;  /* Tells if the file was already read */

FILE *input;          /* Obviously: the input file              */

/*
```

```
/*
 * If the file has already been read, return.
 */
if(imread == 1)
{
        return;
}

/*
 * If the user entered the file name as an argument, store that name.
 * Otherwise, prompt the user for a filename, then store the name entered.
 */
if(argnum > 1)
{
        /*
         * Store the file name.
         */
        sprintf(thedisp->filename,"%s",margs[1]);
}
else
{
        /*
         * Query the user for a file name.
         *
         * KLUDGE ALERT: Here we should put up a DECWindows widget that is
         *               similar to the one used by DECWRITE: it should have
         *               a directory listing, a "file filter", and widgets
         *               that allow the user to enter a filename. Of course,
         *               since this is not a real product, I guess I can
         *               afford to be lazy.
         *                              -RB3 11/7/90
         */
        printf("Enter the filename: ");
        gets(thedisp->filename);
}

/*
 * Attempt to open the file. If the open fails, put out an error message
 * and exit.
 */
input = fopen(thedisp->filename,"r");
if(input == NULL)
{
        /*
         * The attempt to open has failed. Tell the user and exit.
         */
        printf("Cannot find file %s!\n",thedisp->filename);
        exit(1);
}

/*
 * Prepare the display VLIST widget for input, initialize the input and
 * display strings, and initialize the file line counter.
```

```
VListStartBatchUpdate(thedisp->workwidget);
sprintf(inline,"");
sprintf(dislin,"");
thedisp->filesize = 0;

/*
 * Read each line in the file, edit them, and place them in the VLIST widget.
 */
while(fgets(inline,150,input) != NULL)   /* WHILE Loop */
{
    /*
     * Eliminate the NEWLINE at the end of the line, since it would cause
     * weird characters to appear at the end of each line on the VLIST
     * display.
     */
    linelen = strlen(inline);
    inline[linelen-1] = ' ';

/*
     * Scan through the line looking for TABs. Replace each TAB with a
     * fixed number of spaces (this isn't the best way to handle it, but
     * I'm too lazy to do better right now).
     */
    for(lencoun = 0; lencoun < linelen; lencoun++)      /* FOR Loop */
    {
        /*
         * If the character is a TAB, place six spaces on the end of the
         * display string.
         */
        if(inline[lencoun] == '\t')
        {
            strncat(dislin,"      ",6);
        }
        /*
         * ...Otherwise, place the character at the end of the display
         * string.
         */
        else
        {
            strncat(dislin,&inline[lencoun],1);
        }
    }
    /*
     * End of FOR loop.
     */

/*
     * Increment the file line counter and add the new line to the
     * VLIST widget.
     */
    thedisp->filesize++;
```

```
        VListAddLine(thedisp->workwidge,thedisp->filesize,dislin,0,0,0);

/*
         * Re- initializze the input and display strings.
         */
        sprintf(inline,"");
        sprintf(dislin,"");
    }
    /*
     * End of WHILE loop.
     */

/*
     * End the inputs to the VLIST widget.
     */
    VListEndBatchUpdate(thedisp->workwidge);

/*
     * Close the file and set the "file is read" flag.
     */
    fclose(input);
    imread = 1;
}
/*
 * End of GET_FILE_CONTENTS.
 */

/*
 * DISPLAY_DWOBJECT -- Display the contents of a file
 *
 * This is the "gzouta" routine of the display variant. It displays the
 * contents of a file on the screen.
 *
 * Three widgets are displayed by this routine: the VLIST widget which contains
 * the file information, the "selection" button which initiates the switch in
 * the function (and consequently the display), and the "quit" button which
 * exits the application. The application window is resized to accomodate
 * the various widgets, the widgets associated with the printer variant are
 * unrealized, and then everything is realized. The system then enters the
 * event loop.
 */
void
display_dwobject(DisplayData thedisp)
{
    Arg arglist[5];  /* Used to adjust the various widgets       */

/*
     * Change the "function switch" button so that it displays "Print".
     */
    XtSetArg(arglist[0],DwtNlabel,DwtLatin1String("Print"));
    XtSetValues(thedisp->selectbut,arglist,1);
```

```
/*
 * Change the dimensions of the Dialog Box so that the file display VLIST
 * widget can fit inside it.
 */
 XtSetArg(arglist[0],DwtNwidth,690);
 XtSetArg(arglist[1],DwtNheight,450);
 XtSetValues(thedisp->dialogbox,arglist,2);

/*
 * Move the quit button to reflect the new dialog box size.
 */
 XtSetArg(arglist[0],DwtNx,170);
 XtSetArg(arglist[1],DwtNy,250);
 XtSetValues(thedisp->quitbut,arglist,2);

/*
 * Make the printer display window invisible and make the file display
 * window visible.
 */
 XtUnmanageChild(thedisp->mainprt);
 XtManageChild(thedisp->mainwind);

/*
 * Make the printer control buttons invisible.
 */
 XtUnmanageChild(thedisp->gobutt);

/*
 * Realize the application and enter the main loop.
 */
 XtRealizeWidget(thedisp->topwidge);
 VMainLoop();
}
/*
 * End of DISPLAY_DWOBJECT.
 */

/*
 * GET_PRINTER_INFO -- Printer Queue Selecter
 *
 * This is the "gzinta" routine of the print variant. It gets the name of the
 * printer queue that the user desires to use for printing.
 *
 * This routine changes the display to reflect a "printer choice" display.
 * It makes the screen display window invisible and makes visible the window
 * which will display a list of printer queues. A "confirm print" button is
 * also made visible. Note how all widgets are part of the programmer- defined
 * data structure created in FILEFUNC.H, and that the DECWindows widgets were
 * initialized in the initialization routine.
 */
void
get_printer_info(DisplayData thedisp)
```

```
{
    Arg arglist[5];   /* Arguments used for changing widgets      */ static short info = 0;  /* Tells if the printers have been "gotten"   */

/*
     * If the available printer queues haven't been gotten, then get them, and
     * select the first queue on the list.
     */
    if(info == 0)
    {
            /*
             * Get the printer queues. Select the first on the list and set the
             * INFO flag so the list won't be read again.
             */
            getprinters(thedisp->workprt);
            VListSelectLine(thedisp->workprt,1);
            info = 1;
    }

/*
     * Change the function switch button to reflect the "Display" option.
     */
    XtSetArg(arglist[0],DwtNlabel,DwtLatin1String("Display"));
    XtSetValues(thedisp->selectbut,arglist,1);

/*
     * Make the screen display window invisible and make the printer display
     * window visible.
     */
    XtUnmanageChild(thedisp->mainwind);
    XtManageChild(thedisp->mainprt);

/*
     * Resize the dialog box widget.
     */
    XtSetArg(arglist[0],DwtNwidth,400);
    XtSetArg(arglist[1],DwtNheight,450);
    XtSetValues(thedisp->dialogbox,arglist,2);

/*
     * Move the quit button to reflect the new dialog box size.
     */
    XtSetArg(arglist[0],DwtNx,120);
    XtSetArg(arglist[1],DwtNy,250);
    XtSetValues(thedisp->quitbut,arglist,2);

/*
     * Make the "confirm print" button visible.
     */
    XtManageChild(thedisp->gobutt);
```

```
/*
 * Display everything and enter the main event loop.
 */
    XtRealizeWidget(thedisp->topwidget);
    VMainLoop();
}
/*
 * End of GET_PRINTER_INFO.
 */

/*
 * ACTIVATE_PRINTER -- The printer startup routine
 *
 * This code section is the "gzouta" routine of the print variant. It receives
 * the (usual) "DisplayData" structure as its argument.
 *
 * ACTIVATE_PRINTER first checks the "exit loop" reason to ensure that the
 * loop that was entered in GET_PRINTER_INFO was exited by the press of the
 * "Do Print" (print confirmation) button. This is a bit of a kludge; in theory
 * this could have been checked in MAIN before calling this function. If the
 * print confirmation button was not pressed, then this routine returns.
 *
 * If the user did press the confirm print button, ACTIVATE_PRINTER displays
 * a message box which tells the user that the file is being sent to the
 * printer. Then it sends the file to the printer using the function
 * SEND_THE_PRINTER.
 *
 * As with all other Function Object routines, this is a void which returns
 * nothing.
 */
void
activate_printer(DisplayData thedisp)
{
    char messageline[80];   /* Displays the file and selected queue */

/*
 * If the "Screen Display" button was pressed instead of the "confirm print"
 * button, then return.
 */
    if((VGetExitReason()) != DoAPrint)
    {
        return;
    }

/*
 * Set up the system so that messages from the printer queue caan be received.
 *
 * NOTE: This line is part of a messaging system that cannot be used because
 *       of bugs in the system. See PRINTIT.C for further infonnation.
 *
    setup_terminal(update_printer_message);
 */
```

```c
/*
 * Display the message box with its initial message.
 */
    sprintf(messageline,"Sending %s to Queue %s",thedisp->filename,printnam);
    display_printer_message_box(thedisp->topwidge,messageline);

/*
 * Go print the file.
 */
    print_the_file(thedisp->filename,printnam);
}
/*
 * End of ACTIVATE_PRINTER.
 */

/*
 * VMAINLOOP -- The main DECWindows event loop
 *
 * This function enters a loop which gets DECWindows events and "dispatches"
 * them. It continues to do this while the loop flag remains zero.
 *
 * The loop flag is a global variable that is set through the use of VEXITLOOP.
 *
 * This function receives no arguments and returns nothing.
 */
VMainLoop()
{
    XEvent event;  /* The DECWindows event                 */

/*
 * Clear the globally defined loop flag.
 */
    loopflag = 0;

/*
 * Enter the event loop. As long as the loop flag is clear, get a DECWindows
 * event and process it.
 */
    while(!loopflag)
    {
        /*
         * Get the event and process it.
         */
        XtNextEvent(&event);
        XtDispatchEvent(&event);
    }
}
/*
 * End of VMAINLOOP.
 */
```

```
/*
 * VEXITLOOP -- Exit the main event loop
 *
 * This function receives an argument that represents a "reason" for exiting
 * the main event loop (started by VMAINLOOP), and sets the global variable
 * REASON to reflect that argument. It also sets the global variable LOOPFLAG,
 * which causes the main loop to exit.
 */
void
VExitLoop(int why)
{
/*
 * Set the loopflag and the reason to their appropriate values.
 */
  loopflag = 1;
  reason = why;
}
/*
 * End of VEXITLOOP.
 */

/*
 * VGETEXITREASON -- Get the reason for exiting the event loop
 *
 * This function returns a number representing the reason for exiting the event
 * loop. The reason is programmer definable and can be used in any way desired.
 *
 * The reason returned is the global variable REASON, which was set when the
 * loop was exited.
 */
int
VGetExitReason()
{
/*
 * Return the reason for exiting.
 */
  return(reason);
}
/*
 * End of VGETEXITREASON.
 */

/*
 * VLISTPROC -- Process the VLIST widgets
 *
 * This function is the callback function for the VLIST widgets used by the
 * Display and the Print variants. It is the only VLIST callback required, and
 * is called whenever the mouse clicks within the boundary of a VLIST widget.
 *
 * The VLIST widgets are tagged. The display VLIST has a tag of zero, and the
 * printer's VLIST has a tag of one. Both widgets will highlight the line
 * that the mouse clicks on using the "VLISTSELECTCURRENTLINE" function.
```

```
 *
 * If, however, the printer widget is the one that made the callback, then
 * the text in the selected line will be copied into the global string
 * PRINTNAM. PRINTNAM is used by ACTIVATE_PRINTER to send the file to the
 * appropriate queue.
 */
void
vlistproc(dw_widge,tag,vdat)
Widget dw_widge;                    /* The widget that made the call     */
int tag;                    /* The widget's tag           */
VListSelectCallbackStruct *vdat; /* The widget- specific data structure */
{
/*
 * Highlight the line which the mouse has clicked on.
 */
   VListSelectCurrentLine(dw_widge);

/*
 * If the widget making the callback is the "printer" VLIST, then get the
 * selected printer queue and store it.
 */
   if(tag == 1)
   {
        /*
         * Clear out the storage string.
         */
        sprintf(printnam,"");

/*
         * Store the selected printer queue.
         */
        strncpy(printnam,vdat->textP,strlen(vdat->textP)-1);
        printnam[strlen(vdat->textP)-1] = '\0';
   }
}
/*
 * End of VLISTPROC.
 */

/*
 * QUIT_SESSION -- Exit the program
 *
 * This function is called when the "Exit" button is pressed. It calls
 * VEXITLOOP, giving "ExitProgram" as its reason.
 */
void
quit_session(dw_widge,tag,dat)
Widget dw_widge;                    /* The widget that made the call     */
int tag;                    /* The widget's tag           */
DwtAnyCallbackStruct *dat;       /* The widget- specific data structure */
{
/*
```

```
 * Call the exit loop to quit the program.
 */
   VExitLoop(ExitProgram);
}
/*
 * End of QUIT_SESSION.
 */

/*
 * SELECT -- Function Object variant switcher
 *
 * This function is called when the "selection" button (which is the "print"
 * button on the display variant and the "display" button on the print variant)
 * or the "do a print" button is pressed. Both buttons are tagged; the "do
 * a print" button has a tag of zero and the "selection" button has a tag
 * of one.
 *
 * When the "do a print" button is pressed VEXITLOOP is invoked. The reason
 * given is that a print operation is about to be performed.
 *
 * When the "select" button is pressed VEXITLOOP is invoked with the reason
 * that the functions being performed are about to change (the MAIN routine,
 * of course, will change the variant).
 */
void
select(dw_widge,tag,dat)
Widget dw_widge;              /* The widget that made the call    */
int tag;                      /* The widget's tag                 */
DwtAnyCallbackStruct *dat;    /* The widget-specific data structure */
{
/*
 * Perform the action appropriate to the button pressed.
 */
  switch(tag)
  {
    case 0:              /* The "Do a Print" button was pressed    */
        /*
         * Exit the event loop in order to print.
         */
        VExitLoop(DoAPrint);
    break;

case 1:              /* The "Selection" button was pressed     */
        /*
         * Exit the event loop in order to change the variant.
         */
        VExitLoop(ChangeFunction);
    break;
  }
}
/*
 * End of SELECT.
```

```
*/

/*
 * DONEIT -- Callback for the message box's "Acknowledge" button
 *
 * This function is called when the "Acknowledge" button is clicked on. It
 * "Unmanages" the message box, making it disappear.
 */
void
doneit(dw_widge,tag,dat)
Widget dw_widge;            /* The widget that made the call     */
int tag;                    /* The widget's tag                  */
DwtAnyCallbackStruct *dat;  /* The widget- specific data structure */
{
/*
 * Remove the message box.
 */
    XtUnmanageChild(XtParent(dw_widge));
/*
 * The line below is commented out because of various bugs. See PRINTIT.C for
 * more information.
 *                 -RB3
    cleanup_terminal();
 */
}
/*
 * End of DONEIT.
 */

/*
 * SELECT_MY_FONT -- Font setting routine
 *
 * This function receives as its argument a DECWindows widget. It really
 * doesn't matter which widget it receives since the "Display" structure
 * is the only part of the widget that it uses. The widget passed to it,
 * however, should be a managed widget.
 *
 * SELECT_MY_FONT uses X routines to load the font that is indicated by the
 * global string VFONT. This font is placed into a "DwtFontRec" structure.
 * A pointer to this structure is returned.
 *
 * Note: failure conditions are handled inadequately, so mess with the selected
 *       font at your own risk.
 *                                -RB3
 */
DwtFontRec *
select_my_font(widge)
Widget widge;
{
    Font stuff;                 /* The Xlib font structure        */

DwtFontRec *newstuff;  /* The DECWindows font structure    */
```

```c
    Display *the_display;    /* The Xlib display structure    */

/*
     * Allocate memory for the DECWindows font structure. Exit if the allocation
     * fails.
     */
    newstuff = (DwtFontRec *)malloc(sizeof(DwtFontRec));
    if(newstuff == NULL)
    {
            /*
             * Print an error message and exit.
             */
            printf("FONT FAILURE!!!\n");
            exit(1);
    }

/*
     * Get the Xlib display structure from the widget.
     */
    the_display = XtDisplay(widge);

/*
     * If the attempt to get the display structure fails, print out an error
     * message.
     */
    if((the_display == NULL) || (the_display == -1))
    {
            printf("No Display!!!\n");
    }

/*
     * Load the font and place it in the DECWindows font structure.
     */
    stuff = XLoadFont(the_display,Vfont);
    newstuff->font = XQueryFont(the_display,stuff);

/*
     * If the above operation fails, print out an error message.
     */
    if((newstuff->font == NULL) || (newstuff->font == -1))
    {
            printf("FAILED TO GET FONT!!!\n");
    }

/*
     * Return the new font.
     */
    return(newstuff);
}
/*
 * End of SELECT_MY_FONT.
```

```
*/

/*
 * GETPRINTERS -- Get a list of printers
 *
 * This is a slight Kludge. GETPRINTERS receives, as its argument, the VLIST
 * widget which will contain the names of available printer queues. It then
 * opens a file of the path LIST$PRINTERS:PRINT$LIST.DAT and reads the contents
 * of that file into the VLIST widget.
 *
 * Obviously, a better implementation of this function would be for it to
 * query the system for the names of all available printer queues. Fortunately,
 * this program is only a demo; I am too lazy right now to implement it
 * properly. I did, however, create a LIST$PRINTERS logical which can be
 * used to point to the directory where the datafile resides.
 *
 * Users should create a PRINT$LIST.DAT file somewhere with the names of the
 * printer queues that they will use. They should also set the logical to
 * the data file's directory.
 *
 * Error handling here is inadequate, as well. If the file for any reason
 * cannot be read, this function returns and the printer display shows a
 * blank VLIST display.
 */
getprinters(vlistwidge)
Widget vlistwidge;       /* The VLIST widget that will contain the list */
{
    FILE *printlist;/* The Kludgey printer file pointer        */ char line[80];   /* This is just an input line             */ int count = 0;   /* Counts the lines read                  */

/*
     * Open the printer list file. If the open fails, return.
     */
    printlist = fopen("LIST$PRINTERS:print$list.dat","r");
    if(printlist == NULL)
    {
        /*
         * Output an error message and return.
         */
        printf("Cannot FIND printer list!\n");
        return;
    }

/*
     * Prepare the VLIST widget for input.
     */
    VListStartBatchUpdate(vlistwidge);

/*
```

```c
 * Read the first line from the printer list file. Place it in the VLIST
 * widget and store it.
 */
if(fgets(line,80,printlist) != NULL)
{
        /*
         * Place the name of this (first) queue into the VLIST widget.
         */
        count++;
        VListAddLine(vlistwidge,count,line,0,0,0);

/*
         * Store the queue name into the global variable PRINTNAM so that
         * it can be used if no other queue is selected.
         */
        strcpy(printnam,line);
}

/*
 * Read the rest of the printer list file. Place the queue names into the
 * VLIST widget.
 */
while(fgets(line,80,printlist) != NULL)
{
        count++;
        VListAddLine(vlistwidge,count,line,0,0,0);
}

/*
 * End the input to the VLIST widget.
 */
VListEndBatchUpdate(vlistwidge);
}
/*
 * End of GETPRINTERS.
 */

/*
 * UPDATE_PRINTER_MESSAGE -- Change the printer status message
 *
 * This function is a callback function for the printer message handling
 * system (See PRINTIT.C for more information). It simply gets the message that
 * was received from the printer queue and displays that message.
 */
int
update_printer_message()
{
   char getprt[80];/* The message to be displayed            */

/*
 * Get the message to be displayed.
 */
```

```
    read_terminal_message(getprt);

/*
 * Display the message.
 */
    display_printer_message_box(NULL,getprt);
}
/*
 * End of UPDATE_PRINTER_MESSAGE.
 */

/*
 * DISPLAY_PRINTER_MESSAGE_BOX -- Display a printer status message
 *
 * This function is used in a somewhat odd way. It receives the following
 * arguments:
 *
 * 1: The toplevel widget of the application
 * 2: The message to be displayed
 *
 * When the function is called for the first time, it creates the message box.
 * consequently it needs the application's toplevel widget when it is first
 * called. After it creates the message box, it displays the message box
 * with the specified message.
 *
 * In subsequent calls, however, the widget argument can be a NULL since all
 * it does is display the desired message.
 *
 * Nothing is returned from this function.
 */
display_printer_message_box(widge,line)
Widget widge;    /* The toplevel widget (for first invocation) or NULL   */
char *line;      /* The message to be displayed                           */
{
    static short flag = 0;    /* Tells if the function was called once */ static Widget message_box,    /* The main message box             */
            label,                /* Contains the message to be displayed */
            button;               /* "Acknowledge" button              */

Arg arglist[10];              /* List of widget arguments          */

DwtCallback fcalls[2];        /* Callback structures               */

/*
 * If this function has been called for the first time, then create the
 * widgets required for the message box.
 */
    if(!flag)
    {
            /*
             * Set up the callback structure for the "Acknowledge" button.
```

```
*/
fcalls[0].proc = doneit;
fcalls[0].tag = 0;
fcalls[1].proc = NULL;

/*
 * Create a popup dialog box which is Modeless, is capable of taking
 * focus, and can be expanded or shrunk.
 */
XtSetArg(arglist[0],DwtNx,50);
XtSetArg(arglist[1],DwtNy,250);
XtSetArg(arglist[2],DwtNacceptFocus,TRUE);
XtSetArg(arglist[3],DwtNresize,DwtResizeShrinkWrap);
XtSetArg(arglist[4],DwtNstyle,DwtModeless);
XtSetArg(arglist[5],DwtNtakeFocus,True);
message_box = DwtDialogBoxPopupCreate(widge,"Printing...",arglist,6);

/*
 * If the message box creation failed, output a message and return.
 */
if(message_box == NULL)
{
  printf("Failed to create dialog box\n");
  return;
}

/*
 * Create and manage the label which will contain the message.
 */
XtSetArg(arglist[0],DwtNx,10);
XtSetArg(arglist[1],DwtNy,20);
XtSetArg(arglist[2],DwtNresizeHeight,False);
XtSetArg(arglist[3],DwtNcols,30);
label = DwtLabelCreate(message_box,"In Progress...",arglist,4);
XtManageChild(label);

/*
 * Create the "Acknowledge" button.
 */
XtSetArg(arglist[0],DwtNx,10);
XtSetArg(arglist[1],DwtNy,60);
XtSetArg(arglist[2],DwtNactivateCallback,fcalls);
XtSetArg(arglist[3],DwtNlabel,DwtLatin1String("Acknowledge"));
button = DwtPushButtonCreate(message_box,"Ack",arglist,4);
XtManageChild(button);

/*
 * Set the "I've been called" flag.
 */
flag = 1;
}
```

```
/*
 * Set the message label's value to the message to be displayed.
 */
 XtSetArg(arglist[0],DwtNlabel,DwtLatin1String(line));
 XtSetValues(label,arglist,1);

/*
 * Display the message box.
 */
 XtManageChild(message_box);
}
/*
 * End of DISPLAY_PRINTER_MESSAGE_BOX.
 */
```

CODE LISTING IV
EXAMPLE -- MAIN ROUTINE

```
/*****************************************************\
*
*
*
* Copyright (c) Digital Equipment Corporation, 1990
* All Rights Reserved. Unpublished rights reserved
* under the copyright laws of the United States.
*
*
*
*
*
*
*
*
*
* RESTRICTED RIGHTS LEGEND   Use, duplication, or
* disclosure by the U.S. Government is subject to
* restrictions as set forth in Subparagraph (c)(1)(ii)
* of DFARS 252.227-7013, or in FAR 52.227-19, as
* applicable.
*
\*****************************************************/

/*
* DISPVIEW.C -- The MAIN routine
*
*     THIS FILE AND ITS CONTENTS ARE MARKED DIGITAL CONFIDENTIAL
*
* This file contains the MAIN routine for this Example of the use of Function
* Objects. This application is Example 1.
*
* DISPVIEW is a file viewer and printer. It operates using one function object
* which is called VIEWFUNC. VIEWFUNC handles two types of "display" devices:
* a DECWindows screen and a printer. The handling of each device is
* accomplished by creating a "variant" of VIEWFUNC for each device.
*
* This application illustrates how easy it is for a programmer using function
* objects to design applications that can handle different types of devices
* or integrate different (seemingly incompatable) functions. It also shows
* how easily a system can be "architected"; a programmer using function
* objects is encouraged not only to think about the data that is used in
* the application (as in basic object- oriented design) but is almost "forced"
*  to think about what "goes into" a function and  to seperate out the
* different steps of a function (into initialization, input, output, etc.).
* This enables the programmer to create code which is more modular and more
* reuseable -- one of the main benefits of using an object- oriented design
* approach. But function objects also give an added benefit: by representing
* functions as objects then the functionality of an application becomes
* portable, easily adjustable, and reuseable. As the other examples will
* show, this is not always true using ordinary object- oriented design and
```

```
 * implementation methods.
 */
include <stdio.h>
#include <decw$include/DwtWidget.h>
#include "comclass.h"
#include "filefunc.h"

char **margs;           /* Contains the arguments passed into MAIN    */ int argnum;             /* The number of arguments passed to MAIN     */

/*
 * MAIN -- The main routine
 *
 * This main routine illustrates the simplicity of the interface to the file
 * viewer/printer. Here there is only one function object: a "display file
 * contents" function. Depending on what is desired, this function "changes
 * itself" in order to accomodate the different output devices (screen and
 * printer) that it interfaces with.
 *
 * Note the simplicity of the interface to all this application's functions.
 */
main(int argc,char **argv)
{
   Function viewfunc;       /* The function object             */ int selvar,              /* The selected function object variant */
       whyexit;             /* Why the command loop was exited    */

/*
 * Store the arguments and the argument count into global variables so that
 * they can be read by other parts of the program.
 *
 * NOTE: This Kludge would be unnecessary if the function object library had
 *       the ability to handle ARGC and ARGV. This is something that I must
 *       address someday.
 *                          -RB3
 */
   margs = argv;
   argnum = argc;

/*
 * Initialize the function object's variant and the exit reason variable.
 */
   selvar = DISPVAR;
   whyexit = -1;

/*
 * Create the function object.
 */
   viewfunc = CreateFunction(DisplayClass,selvar,initialization,file_input,
                file_output,file_control,file_cleanup,NULL);
```

```
/*
 * Enter a loop which runs the object's input and output routines. Remain
 * in this loop until the "exit" button is pressed.
 */
while(whyexit != ExitProgram)   /* WHILE Loop              */
{
        /*
         * Run the "gzinta" and the "gzouta" routines. Note that at some point
         * in each variant one of the routines enters an event loop. There is,
         * consequently, a "reason" for each return to this loop.
         */
        RunRoutine(viewfunc,GzinFunc);
        RunRoutine(viewfunc,GzouFunc);

/*
         * Get the reason for exiting the event loop.
         */
        whyexit = VGetExitReason();

/*
         * If the reason for exiting the event loop is NOT that the program
         * is exiting, then toggle the variant.
         */
        if(whyexit != ExitProgram)      /* Check Loop              */
        {
        /*
         * If the selection is set to display, then set it to print.
         */
         if(selvar == DISPVAR)
         {
                selvar = PRINTVAR;
         }
        /*
         * If the selection is set to print, then set it to display.
         */
         else if(selvar == PRINTVAR)
         {
                selvar = DISPVAR;
         }

/*
         * Set the variant.
         */
        SetVariant(viewfunc,selvar);
        }                       /* End of Check Loop          */

}                               /* End of WHILE Loop          */

/*
 * Destroy the function object.
 */
```

```
    DestroyFunction(viewfunc);
}
/*
 * End of MAIN.
 */
```

Code Listing 5: PRINTIT.C

```
/****************************************************\
 *
 *
 *
 * Copyright (c) Digital Equipment Corporation, 1990
 * All Rights Reserved. Unpublished rights reserved
 * under the copyright laws of the United States.
 *
 *
 *
 *
 *
 *
 *
 *
 * RESTRICTED RIGHTS LEGEND  Use, duplication, or
 * disclosure by the U.S. Government is subject to
 * restrictions as set forth in Subparagraph (c)(1)(ii)
 * of DFARS 252.227-7013, or in FAR 52.227-19, as
 * applicable.
 *
\****************************************************/ include <stdio.h>
include <iodef.h>
#include <ssdef.h>
#include <sjcdef.h>
#include <errno.h>
#include <time.h>
#include <descrip.h>
#include <ttdef.h>
#include <tt2def.h>
#include <brkdef.h>
#include <file.h>

/*
 * Below is the item list structure used to send a job to the printer queue.
 */
typedef struct item_info
{
    unsigned short buflen;   /* The length of the buffer   */
    unsigned short itmcod;   /* The Item Code              */
    char *bufadr;            /* The buffer                 */
    unsigned short *retlen;  /* Don't know what this does  */
} ITMLST;

/*
 * Below is the IO Status Block used by SYS$SNDJBC.
 */
struct
```

```c
{
    unsigned long status;    /* The return status of the job    */
    unsigned long reserved;  /* Not used to my knowledge        */
} iosb;

/*
 * The structure below is used in the queue message "trapping" system. It is
 * the IO status block of the SYS$QIO function.
 */
struct
{
    short cond_value,    /* The completion status                      */
          count;         /* The number of bytes transferred by QIO     */
    int info;            /* The device- specific information           */
} miosb;

static short tchan,    /* The IO channel to the terminal   */
       mchan;   /* The IO channel to a mailbox      */ int start[3],        /* Stores the current terminal settings   */
    changed[3];      /* Contaains the changed terminal settings */
unsigned int status; /* The status of all operations            */ int ((*repfunc)());    /* The message catching system's callback   */

/*
 * PRINT_THE_FILE -- Send a file to the printer
 *
 * This function receives the following arguments:
 *
 * 1: The name of the file to print
 * 2: The name of the print queue the file is to be sent to.
 *
 * When PRINT_THE_FILE is called, it generates an "item list" using an array of
 * ITMLST structures. It then uses the system call SYS$SNDJBCW to "send" the
 * file to the printer.
 *
 * If the call to SYS$SNDJBCW fails, an error message is output. If the print
 * status shows a failure, then the program exits.
 */
print_the_file(pfile,prnter)
char *pfile,            /* The file to be printed   */
     *prnter;           /* The printer queue        */
{
    ITMLST the_items[20]; /* The list of items for SYS$SNDJBCW */ int status;           /* The status of the print attempt    */

/*
     * Encode the queue name.
     */
```

```
the_items[0].buflen = strlen(prnter);
the_items[0].itmcod = SJC$_QUEUE;
the_items[0].bufadr = prnter;
the_items[0].retlen = 0;

/*
 * Encode the file name.
 */
the_items[1].buflen = strlen(pfile);
the_items[1].itmcod = SJC$_FILE_SPECIFICATION;
the_items[1].bufadr = pfile;
the_items[1].retlen = 0;

/*
 * Set system to notify user of completion.
 */
the_items[2].buflen = 0;
the_items[2].itmcod = SJC$_NOTIFY;
the_items[2].bufadr = 0;
the_items[2].retlen = 0;

/*
 * The End of Structure.
 */
the_items[3].buflen = 0;
the_items[3].itmcod = 0;
the_items[3].bufadr = 0;
the_items[3].retlen = 0;

/*
 * Send the job to the printer queue. Output a message if the send fails.
 */
status = sys$sndjbcw(0,SJC$_ENTER_FILE,0,the_items,&iosb,0,0);
if(!(status & 1))
{
        printf("Print Errors!!!\n");
}

/*
 * Get the status of the actual attempt to print. If the status is bad, exit.
 */
status = iosb.status;
if(!(status & 1))
{
        lib$stop(status);
}
}
/*
 * End of PRINT_THE_FILE.
 */

/*
```

```
* SETUP_TERMINAL -- Activate message catching system
*
* This function is the first part of the "message catching system". It sets up
* a terminal so that unsolicited messages (like printer queue status messages)
* can be "caught" by the application.
*
* The argument for this function is a pointer to the callback function that
* will be called when the unsolicited message is received.
*
* SETUP_TERMINAL works by creating a VMS mailbox, getting and saving the
* current terminal settings, and setting the terminal so that it does not
* echo unsolicited messages. The mailbox is associated with the terminal so
* that the mailbox receives the message. The mailbox is set up so that when
* it receives the message, the callback function is invoked.
*
* The program exits if any part of this function fails.
*/
setup_terminal(function)
int ((*function)());          /* The callback function      */
{
    short thefunc;            /* The function code for SYS$QIOW  */

$DESCRIPTOR(terminal,"SYS$COMMAND");      /* The terminal  */
    $DESCRIPTOR(mailbx,"MESSAGE_CATCHER");    /* The mailbox   */

/*
     * Create a mailbox. If that mailbox cannot be created, exit.
     */
    status = sys$crembx(0,&mchan,0,0,0,0,&mailbx);
    if(!(status & 1))
    {
        /*
         * Output an error message and exit.
         */
        printf("Cannot CREATE mailbox! Status=%d\n",status);
        exit(status);
    }

/*
     * Store the desired callback function.
     */
    repfunc = function;

/*
     * Assign a channel to the terminal. If the channel cannot be opened, exit.
     */
    status = (sys$assign(&terminal,&tchan,0,&mailbx) & 1);
    if(status != 1)
    {
        /*
         * Output an error message and exit.
         */
```

```c
        printf("Cannot OPEN channel!\n");
        exit(1);
}

/*
 * Get all the information on the terminal's current settings. Upon failure,
 * exit.
 */
thefunc = (IO$_SENSEMODE);
status = sys$qiow(0,tchan,thefunc,&miosb,0,0,&start,12,
            0,0,0,0);
if(!(status & 1))
{
        /*
         * Output an error message and exit.
         */
        printf("Cannot GET terminal! Status=%d\n",status);
        exit(status);
}

/*
 * Generate the new terminal settings that will allow messages to be "caught"
 * by the system.
 */
changed[0] = start[0];
changed[1] = (start[1] | TT$M_NOBRDCST | TT$M_MBXDSABL);
changed[2] = (start[2] | TT2$M_BRDCSTMBX);

/*
 * Change the terminal to the new settings. Exit if change fails.
 */
thefunc = (IO$_SETMODE);
status = sys$qiow(0,tchan,thefunc,&miosb,0,0,&changed,12,
            0,0,0,0);
if(!(status & 1))
{
        /*
         * Output an error message and exit.
         */
        printf("Cannot SET terminal! Status=%d\n",status);
        exit(status);
}

/*
 * Associate the mailbox with the terminal so that messages written to the
 * terminal are sent there. When a message is received, the callback function
 * will be called. Of course, exit if this fails.
 */
thefunc =(IO$_SETMODE | IO$M_WRTATTN);
status = (sys$qiow(0,mchan,thefunc,&miosb,0,0,function,0,0,0,
            0,0) & 1);
if(!(status & 1))
```

```
    /*
     * Output an error message and exit.
     */
    printf("Cannot SET terminal! Status=%d\n",status);
    exit(status);
  }

}
/*
 * End of SETUP_TERMINAL.
 */

/*
 * READ_TERMINAL_MESSAGE -- Read an unsolicited message from the terminal
 *
 * This is the second part of the "message catching system". It should be
 * called from the callback routine whose pointer was defined in
 * SETUP_TERMINAL. Its argument is a pointer to a character buffer that will
 * return the message to the calling routine.
 *
 * This function works by reading the contents of the mailbox buffer. The
 * message is placed into the character buffer. Then it resets the mailbox so
 * that if the mailbox receives another unsolicited message, the callback
 * function will be called again.
 *
 * Upon failure, READ_TERMINAL_MESSAGE exits.
 */
read_terminal_message(mbuffer)
char *mbuffer;
{
  int thefunc,
      status;

struct
  {
    short mestype;
    short unit_number;
    char cnt_strng;
    char control_name[3];
    char filler[12];
    short brd_length;
    char messreturn[255];
  } mbuff;

for(thefunc = 0; thefunc < 255; thefunc++)
  {
        mbuff.messreturn[thefunc] = '\0';
  } thefunc =(IO$_READVBLK);
  status = (sys$qiow(2,mchan,thefunc,&miosb,0,0,&mbuff,255,0,0,0,0) & 1);
```

```
        sprintf(mbuffer,"%s",mbuff.messreturn);

thefunc =(IO$_SETMODE | IO$M_WRTATTN);
        status = (sys$qiow(0,mchan,thefunc,&miosb,0,0,repfunc,0,0,0,
                 0,0) & 1);
        if(!(status & 1))
        {
              printf("Cannot SET terminal! Status=%d\n",status);
              exit(status);
        }

} clearup_terminal()
{
  int thefunc;

thefunc = (IO$_SETMODE);
  status = sys$qiow(0,tchan,thefunc,&miosb,0,0,&start,12,
                 0,0,0,0);
  if(!(status & 1))
  {
        printf("Cannot SET terminal! Status=%d\n",status);
        exit(status);
  }

}
```

What is claimed is:

1. A memory device in a computing system, said memory device holding a data structure for allowing a processor to adapt a specified function, said function requiting a specified set of data for execution, to one or more input interfaces and one or more output interfaces, the data structure comprising:
   (a) an operational data structure, the operational data structure containing said specified set of data;
   (b) a pointer to the operational data structure;
   (c) one or more machine executable input routines for obtaining at least a portion of said set of data, each input routine receiving as an argument the pointer to the operational data structure and each input routine configured to receive data through a particular input interface;
   (d) one or more machine executable output routines for outputting at least a portion of said set of data, each output routine receiving as an argument the pointer to the operational data structure and each output routine configured to output data through a particular output interface;
   (e) respective pointers to each input and output routine;
   (f) a variant number; and
   (g) a routine matrix array having at least one entry, wherein each entry associates (1) a pointer to a specified input routine with (2) a pointer to a specified output routine, the variant number serving as an index into the routine matrix array for selecting the entry.

2. The memory device of claim 1 wherein said data structure further includes a class number, the class number serving to classify the routine matrix array according to the specified function.

3. The memory device of claim 1, wherein said data structure further comprises:
   (h) one or more machine executable initialization routines for initialization of the computing system to perform the specified function;
   (i) respective pointers to each initialization routine; and
   (j) wherein each said entry in the routine matrix array associates (1) said pointer to a specified input routine with (2) said pointer to a specified output routine and with (3) a pointer to a specified initialization routine.

4. The memory device of claim 1, wherein said data structure further comprises:
   (h) one or more machine executable destroy routines for removing the routine matrix array and the operational data structure from the computing system;
   (i) respective pointers to each destroy routine; and
   (j) wherein each said entry in the routine matrix array associates (1) said pointer to an input routine with (2) said pointer to an output routine and with (3) a pointer to a specified destroy routine.

5. A memory device in a computing system, said memory device holding a data structure for allowing a processor to adapt a specified function, said function requiting a specified set of data for execution, to one or more input interfaces and one or more output interfaces, the data structure comprising:
   (a) an operational data structure, the operational data structure containing said specified set of data;
   (b) a pointer to the operational data structure;
   (c) one or more machine executable input routines for obtaining at least a portion of said set of data, each input routine receiving as an argument the pointer to the operational data structure and each input routine configured to receive data through a particular input interface;
   (d) one or more machine executable output routines for outputting at least a portion of said set of data, each output routine receiving as an argument the pointer to the operational data structure and each output routine configured to output data through a particular output interface;
   (e) respective pointers to each input and output routine;
   (f) one or more machine executable initialization routines for initialization of the computing system to perform the specified function;
   (g) respective pointers to each initialization routine;
   (h) one or more machine executable destroy routines for removing the routine matrix array and the operational data structure from the computing system;
   (i) respective pointers to each destroy routine;
   (j) a variant number;
   (k) a routine matrix array having at least one entry wherein each entry associates:
   a pointer to an input routine,
   a pointer to an output routine,
   a pointer to an initialization routine, and
   a pointer to a destroy routine,
   the variant number serving as an index into the routine matrix array for selecting the entry; and
   (l) a class number serving to classify the routine matrix array according to the specified function.

6. The memory device of claim 5 wherein said data structure further comprises:
   (m) one or more machine executable control routines for manipulating specific attributes or data associated with the data structure, each control routine receiving as an argument the pointer to the operational data structure;
   (n) respective pointers to each control routine;
   and wherein each routine matrix array entry further associates:
   a pointer to an output routine with
   a pointer to an initialization routine with
   a pointer to a destroy routine with
   a pointer to a control routine.

7. A method for implementing a specified application on computing systems having different interfaces, the method comprising the steps of:
   (a) determining the number of discrete functions that must be performed to implement the specified application;
   (b) for each function, determining the number of different interfaces through which the function must be capable of communicating;
   (c) for each function, defining an operational data structure, the operational data structure including all of the data necessary to implement the function;
   (d) for each function, for each different interface through which the function must be capable of communicating, creating a machine executable routine for communication through the interface;
   (e) for each function, constructing a routine matrix array where each entry in the routine matrix array associates one interface through which the function must be capable of communicating with the routine for communicating through that interface; and
   (f) implementing the application on a computing system having a specified interface by selecting the entry for each function associated with that interface and executing the machine executable routine for communication through that interface.

8. A method for implementing a specified application on computing systems having different interfaces, the method comprising the steps of:

(a) determining the number of discrete functions necessary to implement the specified application;

(b) for each necessary function:

(1) defining an operational data structure including all of the data necessary to perform the function;

(2) determining the number of different interfaces through which the function must be capable of communicating;

(3) creating a machine executable routine for communicating through each interface through which the function must be capable of communicating;

(4) constructing a routine matrix array having entries associating one interface through which the function must be capable of communicating with the routine for communicating through that interface; and (c) implementing the application on a computing system having a specified interface by selecting the entry for each function associated with that interface and executing the machine executable routine associated with that function for communication through that interface.

9. A machine readable program storage device encoding instructions executable by the machine including instructions for performing the method steps of any one of any one of claims 7 or 8.

* * * * *